United States Patent
Shirao

(10) Patent No.: US 8,646,263 B2
(45) Date of Patent: Feb. 11, 2014

(54) WORK VEHICLE AND METHOD FOR CONTROLLING A WORK VEHICLE

(75) Inventor: Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/702,731

(22) PCT Filed: May 9, 2012

(86) PCT No.: PCT/JP2012/061879
§ 371 (c)(1),
(2), (4) Date: Dec. 7, 2012

(87) PCT Pub. No.: WO2013/136536
PCT Pub. Date: Sep. 19, 2013

(65) Prior Publication Data
US 2013/0239558 A1  Sep. 19, 2013

(30) Foreign Application Priority Data
Mar. 15, 2012  (JP) ................... 2012-058552

(51) Int. Cl.
*F16H 61/42*  (2010.01)
(52) U.S. Cl.
USPC .................... 60/327; 60/431; 60/448; 60/490

(58) Field of Classification Search
USPC ........... 60/327, 431, 445, 448, 449, 459, 462, 60/487, 488, 490
See application file for complete search history.

(56) References Cited

U.S. PATENT DOCUMENTS

| 4,554,992 | A | * | 11/1985 | Kassai | 180/307 |
| 7,178,334 | B2 | * | 2/2007 | Beck | 60/424 |
| 7,533,527 | B2 | | 5/2009 | Naruse | |

FOREIGN PATENT DOCUMENTS

| JP | 2009-127826 A | | 6/2009 |
| JP | 2010-223416 A | | 10/2010 |
| JP | 2010223416 A | * | 10/2010 |
| JP | 2011-52792 A | | 3/2011 |
| WO | WO-2005/098148 A1 | | 10/2005 |

* cited by examiner

*Primary Examiner* — Edward Look
*Assistant Examiner* — Logan Kraft
(74) *Attorney, Agent, or Firm* — Global IP Counselors, LLP

(57) ABSTRACT

In a work vehicle, a control section increases the displacement of a hydraulic motor for travel when the drive circuit pressure becomes larger than a target pressure determined according to the engine rotational speed, and reduces the displacement of the hydraulic motor when the drive circuit pressure becomes smaller than the target pressure. The control section increases the target pressure of the hydraulic motor for travel when changing the matching point of the absorption torque curve of the hydraulic pump with respect to the output torque curve of the engine.

10 Claims, 14 Drawing Sheets

WORK VEHICLE AND METHOD FOR CONTROLLING A WORK VEHICLE

CROSS-REFERENCE TO RELATED APPLICATIONS

This application claims priority to Japanese Patent Application No. 2012-058552 filed on Mar. 15, 2012, the disclosure of which is hereby incorporated herein by reference in its entirety.

TECHNICAL FIELD

The present invention relates to a work vehicle and to a method for controlling a work vehicle.

BACKGROUND

Generally, a so called HST (Hydro Static Transmission) is mounted in some work vehicles such as wheel loaders, or the like. In an HST type work vehicle, a hydraulic pump is driven by an engine, and the hydraulic pressure motor for travel is driven by the hydraulic oil ejected by the hydraulic pump. Because of this, the work vehicle travels. In an HST type work vehicle of this kind, by controlling the engine rotational speed, the displacement of the hydraulic pump, and the displacement of the hydraulic motor for travel, and the like, it is possible to control the vehicle speed and the traction force. For example, in Japan Patent Laid-open Patent Publication JP-A-2010-223416 has been disclosed a work vehicle that can aim to reduce the fuel consumption by discriminating the working conditions, and the like, and varying the absorption torque of the hydraulic pump. In this work vehicle, the control mode of the hydraulic pump is switched between the high power mode and the low fuel consumption mode according to the working conditions. When the control mode is switched from the high power mode to the low fuel consumption mode, the matching point of the absorption torque curve of the hydraulic pump with respect to the output torque curve of the engine is changed from the high rotational speed side to the low rotational speed side. At this time, for example, as is shown in FIG. 5, the absorption torque curve of the hydraulic pump is changed from the absorption torque curve of the high power mode to the absorption torque curve of the low fuel consumption mode. Because of this, the matching point is changed from the point MA1 on the high rotational speed side to the point MB1 on the low rotational speed side.

SUMMARY

In an HST type work vehicle, the target pressure is set of the drive circuit pressure supplied to the hydraulic motor for travel. When the drive circuit pressure becomes larger than the target pressure, the displacement of the hydraulic motor for travel is increased. As a result, when the load on the hydraulic motor for travel becomes large, the displacement of the hydraulic motor for travel is increased, and because of this, it is possible to increase the traction force of the work vehicle. Further, when the drive circuit pressure becomes smaller than the target pressure, the displacement of the hydraulic motor for travel is reduced. As a result, when the load on the hydraulic motor for travel becomes small, the displacement of the hydraulic motor for travel is reduced, and because of this, it is possible to increase the vehicle speed. In addition, the target pressure is set so that it increases according to the increase in the engine rotational speed. Because of this, in an HST type work vehicle, the traction force and the vehicle speed change in a stepless manner, and it is possible to change the vehicle speed automatically from a vehicle speed of zero to the maximum vehicle speed without any speed changing operation.

In an HST type work vehicle such as the one above, when the matching point is changed from the high rotational speed side to the low rotational speed side, the absorption torque of the hydraulic pump increases. Because of this, when the load applied by the hydraulic pump on the engine increases, engine rotational speed decreases, and the matching point changes from the high rotational speed side to the low rotational speed side. However, even if the discharge flow rate of the hydraulic pump increases, the drive circuit pressure increases only up to near the target pressure described above. As a result, when the target pressure is lower than a pressure appropriate for the desired matching point on the low rotational speed side, even if the discharge flow rate of the hydraulic pump is increased, since the drive circuit pressure does not increase much, the engine rotational speed does not decrease sufficiently. Because of this, even if it is possible to change the matching point from the high rotational speed side to the low rotational speed side, it is difficult to reach up to the desired matching point on the low rotational speed side. In this case, it is not possible to obtain sufficiently the desired effect of improvement in the engine fuel efficiency.

The purpose of the present invention is to provide a work vehicle and a method for controlling a work vehicle wherein it is possible to further improve the effect of improving the engine fuel efficiency obtained by changing the matching point from the high rotational speed side to the low rotational speed side.

A work vehicle according to the first aspect of the present invention is provided with an engine, a variable displacement type hydraulic pump, a variable displacement type hydraulic motor for travel, a pressure detecting section, an engine controller, and a control section. The hydraulic pump is driven by the engine. The hydraulic motor for travel is driven by the hydraulic oil ejected from the hydraulic pump. The pressure detecting section detects the drive circuit pressure. The drive circuit pressure is the pressure of the hydraulic oil fed from the hydraulic pump to the hydraulic motor for travel. The engine controller controls the output torque from the engine. The control section increases the displacement of the hydraulic motor for travel when the drive circuit pressure becomes larger than the target pressure. The control section decreases the displacement of the hydraulic motor for travel when the drive circuit pressure becomes smaller than the target pressure. The target pressure is determined according to the engine rotational speed. The control section increases the target pressure of the hydraulic motor for travel when the matching point of the absorption torque curve of the hydraulic pump with respect to the output torque curve of the engine is changed from the high rotational speed side to the low rotational speed side.

A work vehicle according to the second aspect of the present invention is the work vehicle according to the first aspect wherein, the control section sets the target pressure based on the target pressure curve. The target pressure curve stipulates the target pressure with respect to the engine rotational speed. The target pressure curve includes a first target pressure curve and a second target pressure curve. The second target pressure curve stipulates a larger target pressure than does the first target pressure curve at the same engine rotational speed. The control section, when changing the matching point from the high rotational speed side to the low rotational speed side, changes the target pressure curve for setting the target pressure from the first target pressure curve to the second target pressure curve.

A work vehicle according to the third aspect of the present invention is the work vehicle according to the first aspect wherein, the control section decreases the target pressure of the hydraulic motor for travel when the matching point of the absorption torque curve of the hydraulic pump with respect to the output torque curve of the engine is changed from the low rotational speed side to the high rotational speed side.

A work vehicle according to the forth aspect of the present invention is the work vehicle according to the first aspect further provided with an acceleration operation member and a vehicle speed detecting section. The acceleration operation member is operated by an operator. The vehicle speed detecting section detects the vehicle speed. The control section, when a first condition is satisfied, changes the matching point from the tow rotational speed side to the high rotational speed side. The first condition is that the vehicle speed is equal to or higher than a prescribed speed, and also, the amount of operation of the acceleration operation member is equal to or more than a prescribed amount, the engine rotational speed is equal to or lower than a prescribed rotational speed and also, the drive circuit pressure is equal to or more than a prescribed pressure.

A work vehicle according to the fifth aspect of the present invention is the work vehicle according to any one of the first to fourth aspects wherein, the control section changes the matching point from the high rotational speed side to the low rotational speed side when a second condition is satisfied wherein the vehicle speed or the drive circuit pressure become equal to or less than prescribed values.

The method for controlling a work vehicle according to the sixth aspect of the present invention is a method for controlling a work vehicle provided with an engine, a variable displacement type hydraulic pump for travel, a variable displacement type hydraulic motor for travel, and a pressure detecting section. The hydraulic pump is driven by the engine. The hydraulic motor for travel is driven by the hydraulic oil ejected from the hydraulic pump. The pressure detecting section detects the drive circuit pressure. The drive circuit pressure is the pressure of the hydraulic oil sent from the hydraulic pump to the hydraulic motor for travel. The method for controlling according to the present aspect is provided with a first step and a second step. In the first step, when the drive circuit pressure becomes larger than the target pressure, the displacement of the hydraulic motor for travel is increased, and when the drive circuit pressure becomes smaller than the target pressure, the displacement of the hydraulic motor for travel is decreased. The target pressure is determined according to the engine rotational speed. In the second step, when changing the matching point of an absorption torque curve of the hydraulic pump for travel with respect to an output torque curve of the engine from the high rotational speed side to the low rotational speed side, the target pressure of the hydraulic motor for travel is increased.

In a work vehicle according to the first aspect of the present invention, the control section, when changing the matching point from the high rotational speed side to the low rotational speed side, increases the target pressure of the hydraulic motor for travel. Because of this, reduction in the drive circuit pressure is suppressed. Because of this, it is possible to reduce sufficiently the engine rotational speed, and to reach from the matching point on the high rotational speed side to the desired matching point on the low rotational speed side. Or else, it is possible to make the matching point approach the desired matching point on the low rotational speed side. As a result, in a work vehicle according to the present aspect, it is possible to further improve the effect of improving the engine fuel efficiency obtained by changing the matching point from the high rotational speed side to the low rotational speed side.

In a work vehicle according to the second aspect of the present invention, the control section, when changing the matching point from the high rotational speed side to the low rotational speed side, changes the target pressure curve for setting the target pressure from the first target pressure curve to the second target pressure curve. Because of this, when changing the matching point from the high rotational speed side to the low rotational speed side, it is possible to increase the target pressure of the hydraulic motor for travel.

In a work vehicle according to the third aspect of the present invention, the control section, when changing the matching point from the low rotational speed side to the high rotational speed side, decreases the target pressure of the hydraulic motor for travel. Because of this, it is possible to make the matching point reach from the low rotational speed side up to the desired matching point on the high rotational speed side. Or else, it is possible to make the matching point approach the desired matching point on the high rotational speed side. Because of this, it is possible to increase the work efficiency.

in a work vehicle according to the fourth aspect of the present invention, if the first condition is satisfied, the matching point is switched from the low rotational speed side to the high rotational speed side. Here, in the first condition, reason why the vehicle speed and the amount of operation of the accelerating operation member are taken as the condition is because of assuming a condition in which the driver of the work vehicle such as a wheel loader or the like is demanding further acceleration during high speed travel. Further, the reason why the engine rotational speed and the drive circuit pressure are set as the condition is because, it is assumed that, the condition in which the engine rotational speed has decreased below a prescribed value while traveling at a high speed with the amount of operation of the accelerating operation member being large, and also, the drive circuit pressure is above a prescribed value is, relatively, when traveling on an upward slope during which a large absorption torque is required of the hydraulic pump for travel. Therefore, in situations in which such the first condition is satisfied, by shifting the matching point in the direction of reducing the absorption torque of the hydraulic pump for travel, it becomes possible to travel in a state in which sufficient horsepower is obtained.

In a work vehicle according to the fifth aspect of the present invention, when the second condition is satisfied, the matching point is switched from the high rotational speed side to the low rotational speed side. The reason that the vehicle speed or the drive circuit pressure decreasing below prescribed values is taken as the condition is that, when the vehicle speed or the drive circuit pressure decreasing below prescribed values, it can be assumed that the state of traveling at a high speed in an upward slope has ended.

In a work vehicle according to the sixth aspect of the present invention, when changing the matching point from the high rotational speed side to the low rotational speed side, the target pressure of the hydraulic motor for travel is increased. Because of this, a reduction in the drive circuit pressure is suppressed. Because of this, it is possible to decrease the engine rotational speed sufficiently, and to make the matching point reach the desired matching point on the low rotational speed side from the matching point on the high rotational speed side. Or else, it is possible to make the matching point come close to the desired matching point on the low rotational speed side. As a result, in a work vehicle according to the present aspect, it is possible to increase further the effect of increasing the fuel efficiency of the engine obtained by changing the matching point from the high rotational speed side to the low rotational speed side.

BRIEF DESCRIPTION OF DRAWINGS

FIG. 15 is a flow chart showing the processing for determining whether or not the boom pressure low flag is ON.

DESCRIPTION OF EMBODIMENTS

Preferred Embodiment 1

Figure 1:
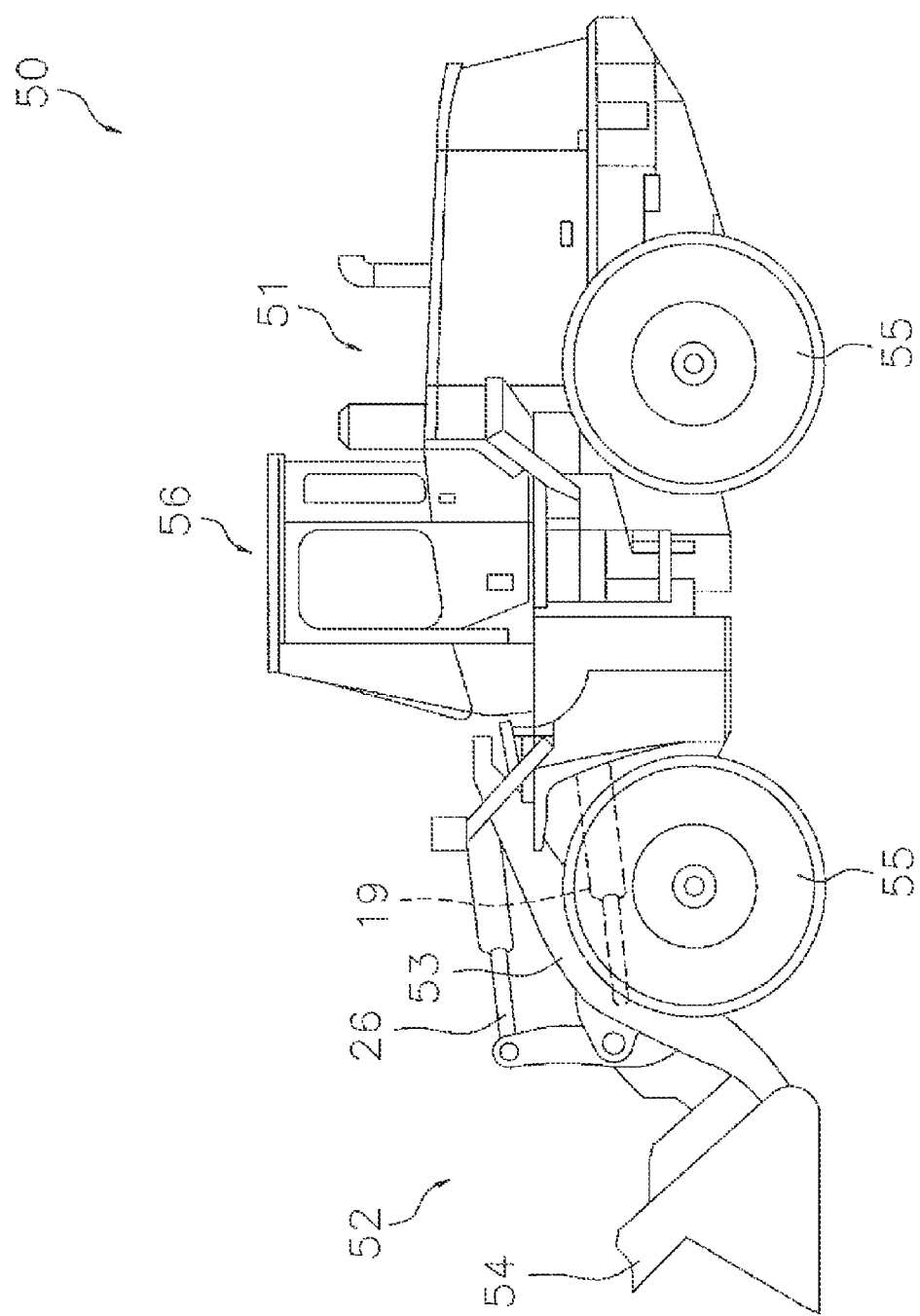
FIG. 1 is a side elevation drawing showing the configuration of a work vehicle according to one preferred embodiment of the present invention.

Regarding a work vehicle 50 according to a preferred embodiment of the present invention, descriptions are given in the following using the drawings, FIG. 1 is a side elevation drawing of a work vehicle 50. As is shown in FIG. 1, the work vehicle 50 is a wheel loader and is provided with a vehicle body 51, a work implement 52, a plurality of tires 55, and a cab 56. The work implement 52 is mounted at the front portion of the vehicle body 51. The work implement 52 has a boom 53, a bucket 54, a lifting cylinder 19, and a bucket cylinder 26. The bucket 54 is attached to the tip of the boom 53. The boom 53 is a member for lifting up the bucket 54 which is attached to its tip. The boom 53 is driven by the lifting cylinder 19. The bucket 54 is attached to the tip of the boom 53. The bucket 54 is dumped or tilted by the bucket cylinder 26. The cab 56 is mounted on the top portion of the vehicle body 51.

Figure 2:
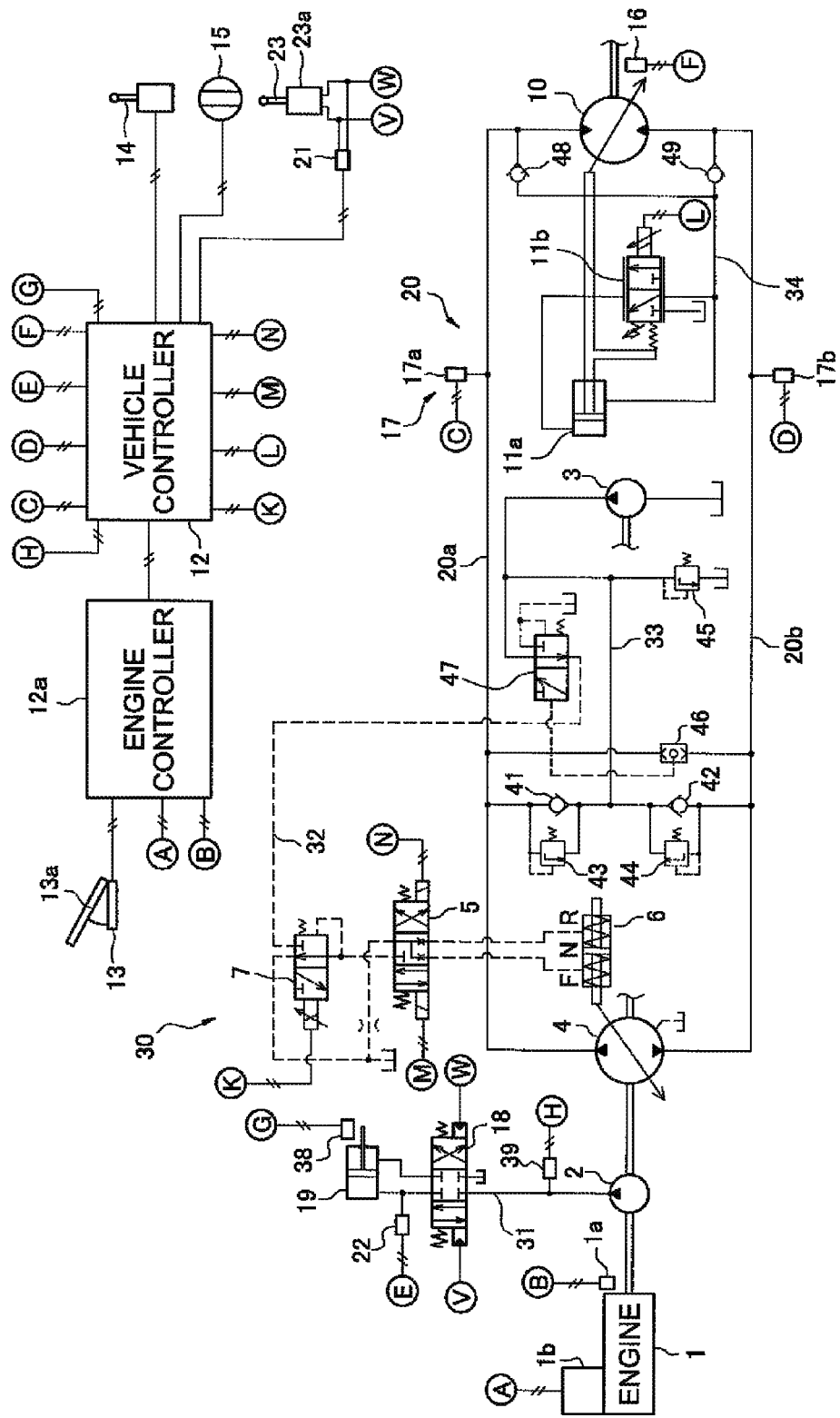
FIG. 2 is a hydraulic circuit diagram showing an HST system mounted in the work vehicle according to one preferred embodiment of the present invention.

FIG. 2 is a block diagram showing the configuration of a hydraulic drive mechanism 30 mounted in the work vehicle 50. The hydraulic drive mechanism 30 has, mainly, engine 1, work implement steering pump 2, a charge pump 3, and a hydraulic pump 4 for travel, a hydraulic motor 10 for travel, an engine controller 12a, a vehicle body controller 12, an accelerator opening degree sensor 13, a forward/reverse selection operating member 14, an acceleration range selection member 15, a vehicle speed sensor 16 and a drive circuit pressure detection section 17, and a drive hydraulic circuit 20. In the hydraulic drive mechanism 30, the hydraulic pump 4 for travel ejects hydraulic oil due to being driven by the engine 1. The hydraulic motor 10 for travel is driven by the hydraulic oil ejected by the hydraulic pump 4 for travel. The work vehicle 50 travels because of the hydraulic motor 10 for travel rotationally driving the above tire 55. In other words, in the hydraulic driving mechanism 30, the so called one-pump one-motor HST system is adopted.

The engine 1 is a diesel type engine, and the output torque generated by the engine 1 is transmitted to the work implement steering pump 2, the charge pump 3, and the hydraulic pump 4 for travel, and the like. The engine controller 12a controls the output torque and the rotational speed of the engine 1. The engine controller 12a adjusts the amount of fuel injected according to amount of operation of the accelerating operation member 13a (hereinafter referred to as the "accelerator opening degree". Further, in the engine 1 is provided an engine rotational speed sensor 1a that detects the actual rotational speed of the engine 1. The rotational speed signal from the engine rotational speed sensor 1a is input to the engine controller 12a. The engine controller 12a is an electronic control section having an operational device such as a CPU or the like, and various memories, and so on. In addition, to the engine 1 is connected a fuel injection device 1b. The engine controller 12a, by controlling the fuel injection device 1b according to the accelerator opening degree, adjusts the engine rotational speed.

The accelerator operating member 13a is a member for instructing the target rotational speed of the engine 1. The accelerator operating member 13a, for example, is an accelerator pedal, and is operated by the operator. The accelerator operating member 13a is connected to the accelerator opening degree sensor 13. The accelerator opening degree sensor 13 is configured from a potentiometer or the like. The accelerator opening degree sensor 13 transmits an opening degree signal indicating the detected accelerator opening degree to the engine controller 12a. The engine controller 12a receives the opening degree signal and outputs an instruction signal to the fuel injection device 1b. Through this, the engine controller 12a controls the amount of fuel injected. Therefore, the operator, by adjusting the amount of operation of the accelerator operating member 13a, controls the rotational speed of the engine 1.

The hydraulic pump 4 for travel ejects the hydraulic oil by being driven by the engine 1. The hydraulic pump 4 for travel is a variable displacement type hydraulic pump. The hydraulic oil ejected by the hydraulic pump 4 for travel is sent to the hydraulic motor 10 for travel by passing through the drive hydraulic circuit 20. In specific terms, the drive hydraulic circuit 20 has a first drive circuit 20a and a second drive circuit 20b. Because of the hydraulic oil being supplied from the hydraulic pump 4 for travel to the hydraulic motor 10 for travel via the first drive circuit 20a, the hydraulic motor 10 for travel is driven in one direction (for example the forward direction). Because of the hydraulic oil being supplied from the hydraulic pump 4 for travel to the hydraulic motor 10 for travel via the second drive circuit 20a, the hydraulic motor 10 for travel is driven in the other direction (for example the reverse direction). The drive circuit pressure detecting section 17 detects the pressure of the hydraulic oil (hereinafter referred to as the "drive circuit pressure") supplied to the hydraulic motor 10 for travel via the first drive circuit 20*a* or the second drive circuit 20*b*. The drive circuit pressure detecting section 17 is an example of the pressure detecting section of the present invention. In specific terms, the drive circuit pressure detecting section 17 has a first drive circuit pressure sensor 17*a* and a second drive circuit pressure sensor 17*b*. The first drive circuit pressure sensor 17*a* detects the hydraulic pressure of the first drive circuit 20*a*. The second drive circuit pressure sensor 17*b* detects the hydraulic pressure of the second drive circuit 20*b*. The first drive circuit pressure sensor 17*a* and the second drive circuit pressure sensor 17*b* transmit the detected signals to the vehicle body controller 12. Further, to the hydraulic pump 4 for travel are connected an FR switching section 5 for controlling the direction of ejection of the hydraulic pump 4 for travel and a pump displacement controlling cylinder 6.

The FR switching section 5 is a solenoid controlled valve that switches the direction of supply of the hydraulic oil to the pump displacement controlling cylinder 6 based on the control signal from the vehicle body controller 12. The FR switching section 5, by switching the direction of supply of the hydraulic oil to the pump displacement controlling cylinder 6, switches the direction of ejection by the hydraulic pump 4 for travel. In specific terms, the FR switching section 5 switches to direction of ejection of the hydraulic pump 4 for travel between ejection to the first drive circuit 20*a* and ejection to the second drive circuit 20*b*. The pump displacement controlling cylinder 6 is driven by the hydraulic oil being supplied via a pump pilot circuit 32, and changes the tilting angle of the hydraulic pump 4 for travel.

In the pump pilot circuit 32 is placed a pump displacement controlling section 7. The pump displacement controlling section 7 is a solenoid controlled valve which is controlled based on the control signal from the vehicle body controller 12. The pump displacement controlling section 7 controls the flow rate of the hydraulic oil supplied to the pump displacement controlling cylinder 6 via the pump pilot circuit 32.

The pump pilot circuit 32 is connected via a cutoff valve 47 to a charging circuit 33 and a hydraulic oil tank. The pilot port of the cutoff valve 47 is connected via a shuttle valve 46 to the first drive circuit 20*a* and the second drive circuit 20*b*. The shuttle valve 46 guides the larger of the hydraulic pressure of the first drive circuit 20*a* and the hydraulic pressure of the second drive circuit 20*b* to the pilot port of the cutoff valve 47. Because of this, the drive circuit pressure is applied to the pilot port of the cutoff valve 47. The cutoff valve 47, when the drive circuit pressure is lower than a prescribed cutoff pressure, connects together the charging circuit 33 and the pump pilot circuit 32. Because of this, the hydraulic oil is supplied from the charging circuit 33 to the pump pilot circuit 32. The cutoff valve 47, when the drive circuit pressure becomes equal to or higher than a prescribed cutoff pressure, connects together the pump pilot circuit 32 and the hydraulic oil tank and lets the hydraulic oil of the pump pilot circuit 32 escape to the hydraulic oil tank. Because of this, due to the hydraulic pressure of the pump pilot circuit 32 decreasing, the displacement of the hydraulic pump 4 for travel is reduced, and any rise in the drive circuit pressure is suppressed.

A charging pump 3, is driven by the engine 1, and is a pump for supplying hydraulic oil to the drive hydraulic circuit 20. The charging pump 3 is connected to the charging circuit 33. The charging pump 3 supplies hydraulic oil to the pump pilot circuit 32 via the charging circuit 33. The charging circuit 33 is connected to the first drive circuit 20*a* via a first check valve 41. The first check valve 41, although permits the flow of hydraulic oil from the charging circuit 33 to the first drive circuit 20*a*, restricts the flow of hydraulic oil to the charging circuit 33 from the first drive circuit 20*a*. The charging circuit 33 is connected to the second drive circuit 20*b* via a second check valve 42. The second check valve 42, although permits the flow of hydraulic oil from the charging circuit 33 to the second drive circuit 20*b*, restricts the flow of hydraulic oil to the charging circuit 33 from the second drive circuit 20*b*. Further, the charging circuit 33 is connected to the first drive circuit 20*a* via a first relief valve 43. The first relief valve 43 is opened when the hydraulic pressure of the first drive circuit 20*a* becomes higher than a prescribed pressure. The charging circuit 33 is connected to the second drive circuit 20*b* via a second relief valve 44. The second relief valve 44 is opened when the hydraulic pressure of the second drive circuit 20*b* becomes higher than a prescribed pressure. In addition, the charging circuit 33 is connected to the hydraulic oil tank via a low pressure relief valve 45. The low pressure relief valve 45 is opened when the hydraulic pressure of the charging circuit 33 becomes larger than a prescribed relief pressure. Because of this, the drive circuit pressure is adjusted so that it does not exceed the prescribed relief pressure.

The work implement steering pump 2 is driven by the engine 1. The hydraulic oil ejected from the work implement steering pump 2 is fed to a lifting cylinder 19 or a steering cylinder (not shown in the figure) via a hydraulic circuit 31 for the work implement. Because of this, the work implement 52 is driven. In addition, the orientation of the tires 55 is changed. The ejection pressure of the work implement steering pump 2 (hereinafter referred to as "work implement steering pump pressure") is detected by an ejection pressure sensor 39. The ejection pressure sensor 39 sends the detected signal to the vehicle body controller 12. Further, in the hydraulic circuit 31 for controlling the work implement is provided a work implement control valve 18. The work implement control valve 18 is driven according to the amount of operation of the work implement operating member 23. The work implement control valve 18, according to the pilot pressure applied to the pilot port, controls the flow rate of the hydraulic oil supplied to the lifting cylinder 19. The pilot pressure applied to the pilot port of the work implement control valve 18 is controlled by the pilot valve 23*a* of the work implement operating member 23. The pilot valve 23*a* applies a pilot pressure according to the amount of operation of the work implement operating member 23 to the pilot port of the work implement control valve 18. Because of this, the lifting cylinder 19 is controlled according to the amount of operation of the work implement operating member 23. The pilot pressure applied to the pilot port of the work implement control valve 18 is detected by the PPC pressure sensor 21. In addition, the pressure of the hydraulic oil supplied to the lifting cylinder 19 is detected by the boom pressure sensor 22. The PPC pressure sensor 21 and the boom pressure sensor 22 send the detected signals to the vehicle body controller 12. Further, in the lifting cylinder 19 is provided a boom angle detection section 38. The boom angle detection section 38 detects the boom angle described later. The boom angle detection sensor 38 is a sensor that detects the angle of rotation of the boom 53. Or else, the boom angle detection sensor 38 can detect the amount of stroke of the lifting cylinder 19, and can compute the angle of rotation of the boom 53 from the amount of stroke. The boom angle detection section 38 sends the detected signal to the vehicle body controller 12. Further, even the bucket cylinder 26, similar to the lifting cylinder 19, is controlled by a control valve, but this has not been shown in FIG. 2.

The hydraulic motor 10 for travel is a variable displacement type hydraulic motor. The hydraulic motor 10 for travel is driven by the hydraulic oil ejected from the hydraulic pump 4 for travel, and generates the driving force for travel. In the hydraulic motor 10 for travel are provided a motor cylinder 11*a* and a motor displacement controlling section 11*b*. The motor cylinder 11*a* varies the angle of inclination of the hydraulic motor 10 for travel. The motor displacement controlling section 11*b* is an electromagnetically controlled valve that is controlled based on the control signal from the vehicle body controller 12. The motor displacement controlling section 11*b*, controls the motor cylinder 11*a* based on the control signal from the vehicle body controller 12. The motor cylinder 11*a* and the motor displacement controlling section 11*b* are connected to the motor pilot circuit 34. The motor pilot circuit 34 is connected to the first drive circuit 20*a* via a check valve 48. The check valve 48, although permits the flow of the hydraulic oil from the first drive circuit 20*a* to the motor pilot circuit 34, restricts the flow of the hydraulic oil from the motor pilot circuit 34 to the first drive circuit 20*a*. The motor pilot circuit 34 is connected to the second drive circuit 20*b* via a check valve 49. The check valve 49, although permits the flow of the hydraulic oil from the second drive circuit 20*b* to the motor pilot circuit 34, restricts the flow of the hydraulic oil from the motor pilot circuit 34 to the second drive circuit 20*b*. Because of the check valves 48 and 49, the hydraulic oil having the larger pressure of die first drive circuit 20*a* and the second drive circuit 20*b* is supplied to the motor pilot circuit 34. The motor displacement controlling section 11*b*, based on the control signal from the vehicle body controller 12, switches the direction of supply and the supply flow rate of the hydraulic oil from the motor pilot circuit 34 to the motor cylinder 11*a*. Because of this, the vehicle body controller 12 can freely vary the displacement of the hydraulic motor 10 for travel. In addition, it is possible to set the maximum displacement or the minimum displacement of the hydraulic motor 10 for travel arbitrarily.

The vehicle speed sensor 16 detects the vehicle speed. The vehicle speed sensor 16 transmits the vehicle speed signal to the vehicle body controller 12. The vehicle speed sensor 16 detects the vehicle speed, for example, by detecting the rotational speed of the tire driving axle. The vehicle speed sensor is an example of the vehicle speed detecting section of the present invention.

The vehicle body controller 12 is an electronic control section including an operation device such as a CPU or the like, and various types of memories. The vehicle body controller 12 is an example of the control section of the present invention. The vehicle body controller 12, by carrying out electronic control of the different control valves based on the output signals from the different detection sections, controls the displacement of the hydraulic pump 4 for travel and the displacement of the hydraulic motor 10 for travel.

Figure 3:
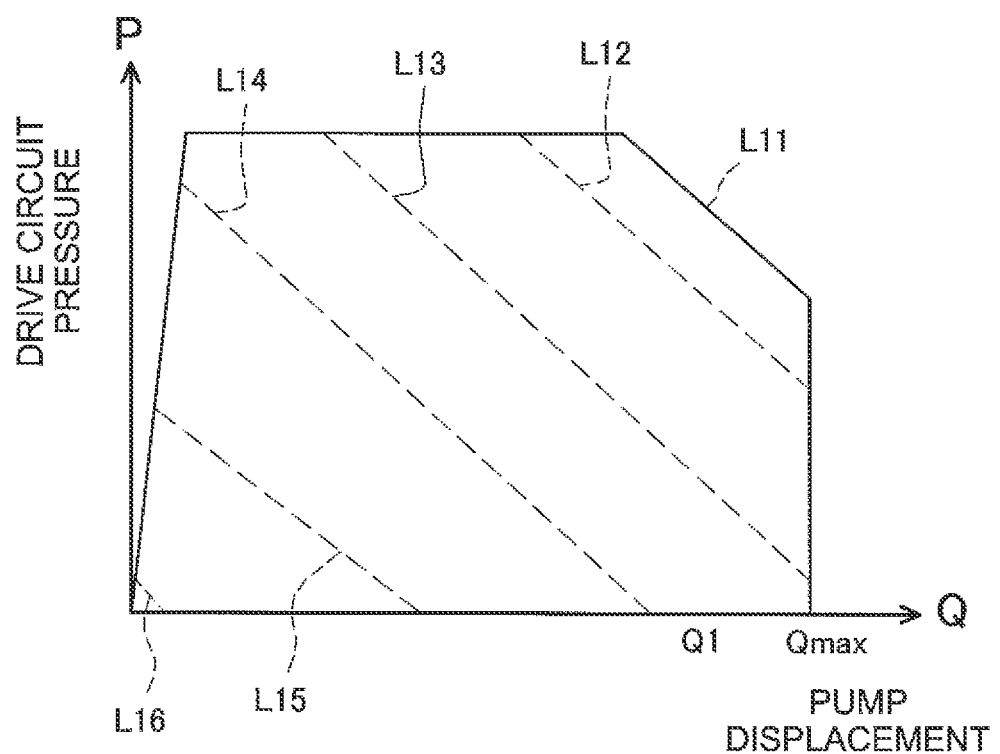
FIG. 3 is a diagram showing an example of the pump displacement-drive circuit pressure characteristics.

In concrete terms, the vehicle body controller 12, outputs a command signal to the pump displacement controlling section 7 based on the engine rotational speed detected by the engine rotational speed sensor la. Because of this, the relationship between the pump displacement and the drive circuit pressure is established. In FIG. 3, an example is shown of the pump displacement-drive circuit pressure characteristics. The pump displacement-drive circuit pressure characteristics show the relationship between the pump displacement and the drive circuit pressure. L11 to L16 in the figure are lines showing the pump-drive circuit pressure characteristics which are varied according to the engine rotational speed. In concrete terms, because the vehicle body controller 12 controlling the flow rate of the pump displacement controlling section 7 based on the engine rotational speed, the pump displacement-drive circuit pressure characteristics are changed among L11 to L16. Because of this, the pump displacement is controlled according to the engine rotational speed. Further, the vehicle body controller 12, by controlling the FR switching valve based the operation signal from the forward-reverse switching operation member 14, controls the direction ejection of the hydraulic oil from the hydraulic pump 4 for travel.

Figure 4:
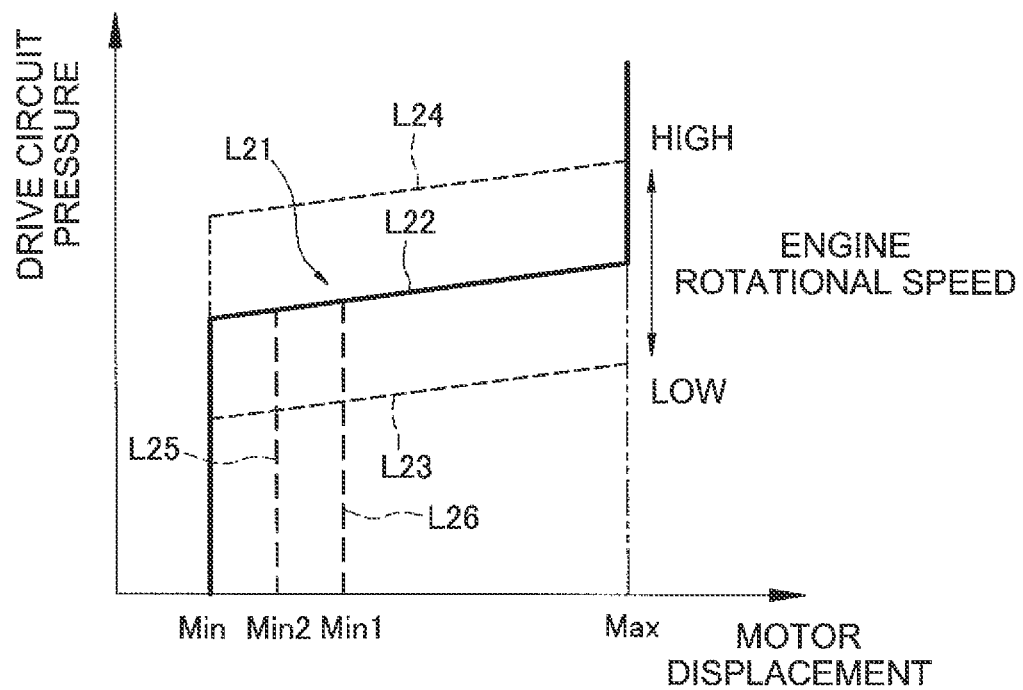
FIG. 4 is a diagram showing an example of the motor displacement-drive circuit pressure characteristics.

The vehicle body controller 12 processes the output signals from the engine rotational speed sensor la and the drive circuit pressure detecting section 17, and outputs the command signal for motor displacement to the motor displacement controlling section 11*b*. Here, the vehicle body controller 12 refers to the motor displacement drive circuit pressure characteristics stored in the vehicle body controller 12, and sets the motor displacement from the value of the engine rotational speed and the value of the drive circuit pressure. The vehicle body controller 12 outputs to the motor displacement control section 11 a change command for the angle of inclination corresponding to this set motor displacement. In FIG. 4 is shown an example of the motor displacement drive circuit pressure characteristics. The continuous line L21 in the figure is a line determining the motor displacement corresponding to the drive circuit pressure in a state in which the engine rotational speed has a certain value. The motor displacement here corresponds to the angle of inclination of the hydraulic motor 10 for travel. The angle of inclination is a minimum (Min) when the drive circuit pressure is equal to or below a certain value. After that, even the angle of inclination gradually becomes larger as the drive circuit pressure increases (the inclined portion 122 of the continuous line). Further, after the angle of inclination has become a maximum (Max), the angle of inclination maintains its maximum angle of inclination Max even if the drive circuit pressure increases. The inclined portion L22 stipulates the target pressure of the drive circuit pressure. In other words, the vehicle body controller 12 increases the displacement of the hydraulic motor for travel when the drive circuit pressure is larger than the target pressure. Also, when the drive circuit pressure becomes smaller than the target pressure, the displacement of the hydraulic motor for travel is reduced. Further, the target pressure is set based on the target pressure curve described below. The target pressure curve indicates the relationship between the engine rotational speed and the target pressure. Therefore, the target pressure is determined according to the engine rotational speed. In other words, the setting is made so that the inclined portion L22 shown in FIG. 4 goes up or down according to whether the engine rotational speed increases or decreases. In concrete terms, the inclined portion L22 is controlled so that if the engine rotational speed is low, the angle of inclination becomes large from a state of lower drive circuit pressure, and the maximum angle of inclination is reached in a state of lower drive circuit pressure (see the inclined portion L23 of the broken line in the lower part of FIG. 4). On the contrary, if the engine rotational speed is high, the control is carried out so that the minimum angle of inclination Min is maintained until the drive circuit pressure becomes much higher, and the maximum angle of inclination Max is reached in a state of still higher drive circuit pressure (see the inclined portion L24 of the broken line in the upper part of FIG. 4). Because of this, the traction force and the vehicle speed of the work vehicle can be varied in a stepless manner, and it is possible to change the speed automatically from zero vehicle speed to the maximum vehicle speed without carrying out any gear changing operation.

Further, the vehicle body controller 12, by the operator selecting the speed variation range using the vehicle speed range selecting member 15, carries out a variable maximum speed control. The vehicle speed range selecting member 15 is, for example, is a switch for selecting the speed range. In the variable maximum speed control, because of the vehicle body controller 12 limiting the minimum displacement of the motor according to the set speed range, limits the maximum vehicle speed of the work vehicle. For example, if the speed range is set to the third speed range, the minimum displacement of the motor is limited to Min2 as shown by the broken tine L25 in FIG. 4. Because of these, the maximum speed is limited to a speed lower than the maximum speed in the state in which no variable maximum speed control is carried out. Further, if the vehicle speed range is set to the second speed range, as is shown in the broken line L26 in FIG. 4, the variable minimum motor displacement is limited to Min1. Because of this, the maximum speed is limited to a still smaller value.

Figure 5:
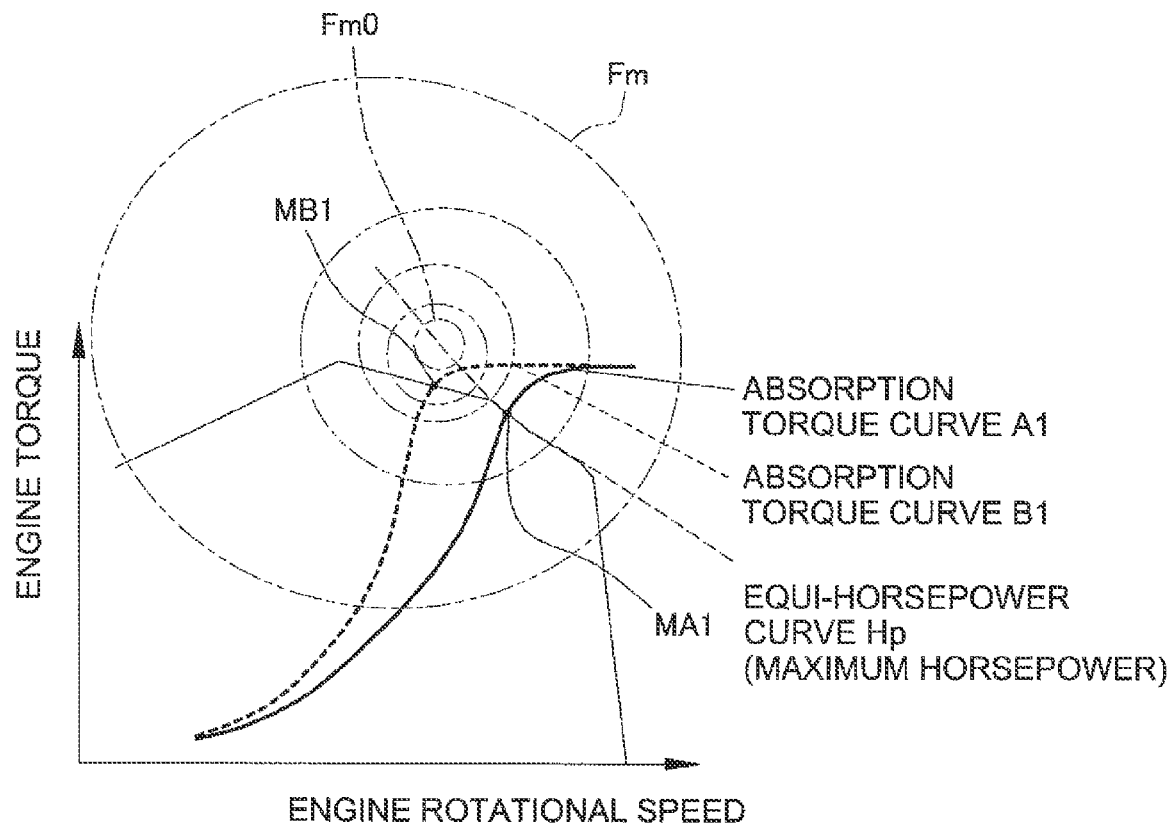
FIG. 5 is a diagram showing an example of the engine output torque curve and the absorption torque curve of the hydraulic pump.

When the conditions to be described later are satisfied, the vehicle body controller 12 carries out the control of switching the matching point of the absorption torque line of the hydraulic pump 4 for travel with respect to the output torque line of the engine 1. FIG. 5 shows an example of the output torque curve of the engine 1 and the absorption torque curve of the hydraulic pump 4 for travel. The output torque curve of the engine 1 shows the relationship between the rotational speed of the engine 1 and the magnitude of the maximum output torque that the engine 1 can output at each rotational speed. The absorption torque curve of the hydraulic pump 4 for travel shows the relationship between the rotational speed of the engine 1 and the magnitude of the maximum absorption torque that the hydraulic pump 4 for travel can absorb at each rotational speed. The vehicle body controller 12, in a state in which the load on the hydraulic pump 4 for travel is relatively small such as in the normal traveling state, etc., carries out control of selecting the absorption torque curve B1 of the hydraulic pump 4 for travel so as to match the output torque curve of the engine 1 on the low rotational speed side (the low fuel consumption side). The vehicle body controller 12, in a state in which the load on the hydraulic pump is relatively high, such as when climbing a slope at a high speed or when carrying out operations while traveling at a medium or high speed, carries out control of selecting the absorption torque curve A1 of the hydraulic pump 4 for travel so as to match on the high rotational speed side (the high power output side).

In FIG. 5, Fm indicates the fuel consumption map in the engine 1. In the fuel consumption map Fm, it is indicated that the fuel consumption improves as the central portion Fm0 is approached. As is shown in FIG. 5, the matching point MB1 on the low rotational speed side is positioned closer to the central portion Fm0 of the fuel consumption map Fm than the matching point MA1 on the high rotational speed side. In other words, the matching point MB1 on the low rotational speed side (hereinafter referred to as "low matching point") is positioned in a better fuel consumption region in the fuel consumption map Fm than the matching point MA1 on the high rotational speed side (hereinafter referred to as "high matching point"). Therefore, by switching the matching point to the low matching point MB1, it is possible to make the work vehicle operate in a state in which the fuel consumption ratio is low. Further, Hp in FIG. 5 indicates the equi-power curve of the maximum power. As is shown in FIG. 5, the high matching point MA1 is positioned closer to the equi-power curve Hp than the low matching point MB1. Therefore, by switching the matching point to the high matching point MA1, it is possible to make the work vehicle operate in a high output power state.

Figure 6:
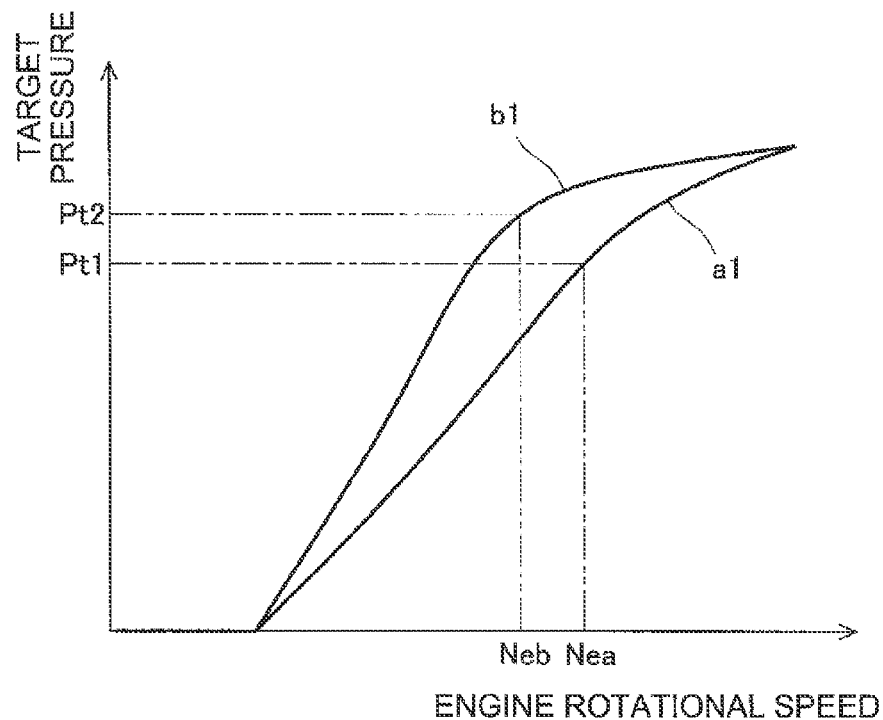
FIG. 6 is a diagram showing an example of the target pressure curve.

In addition, the vehicle body controller 12, when changing the matching point from the high rotational speed side to the low rotational speed side, increases the target pressure of the hydraulic motor 10 for travel. The vehicle body controller 12, when changing the matching point from the low rotational speed side to the high rotational speed side, reduces the target pressure of the hydraulic motor for travel. In concrete terms, the vehicle body controller, as is shown in FIG. 6, is storing a plurality of target pressure curves a1 and b1. The target pressure curves a1 and b1 stipulate the target pressure corresponding to the engine rotational speed. In the target pressure curves a1 and b1, the target pressure is determined so as to increase with increases in the engine rotational speed. The target pressure curves a1 and b1 include a first target pressure curve a1 and a second target pressure curve b1. The second target pressure curve b1 stipulates a larger target pressure than the first target pressure curve a1 at the same engine rotational speed. The vehicle body controller 12, when changing the matching point from the high rotational speed side to the low rotational speed side, changes the target pressure curve for setting the target pressure from the first target pressure curve a1 to the second target pressure curve b1. In other words, the vehicle body controller 12, when setting the matching point to the high matching point MA1, sets the target pressure based on the first target pressure curve a1. Further, the vehicle body controller 12, when setting the matching point to the low matching point MB1, sets the target pressure based on the second target pressure curve b1. Further, the first target pressure curve a1 is set so that a pressure corresponding to the target high matching point MA1 is set as the target pressure. The second target pressure curve b1 is set so that a pressure corresponding to the target low matching point MB1 is set as the target pressure.

Figure 7:
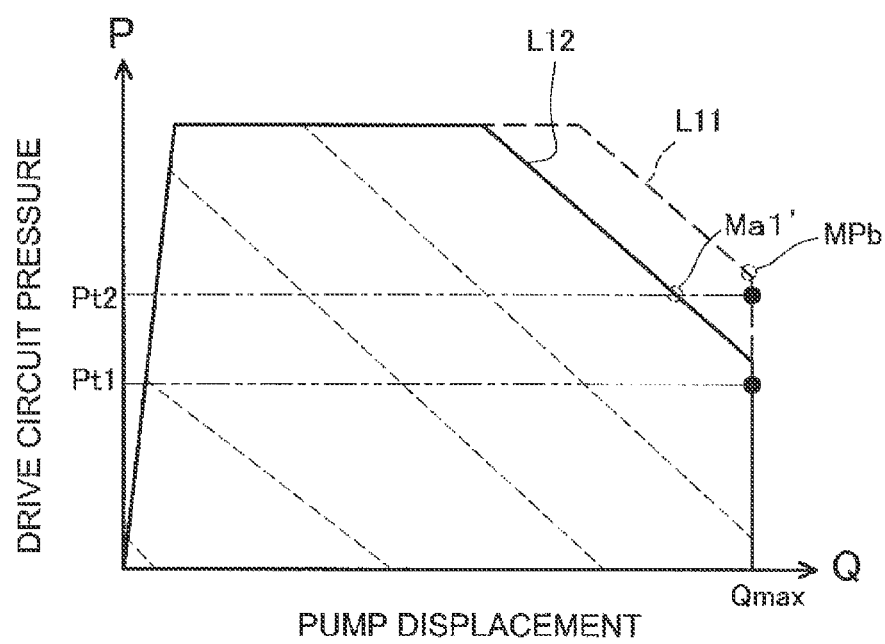
FIG. 7 is a diagram showing the change in the drive circuit pressure when a switch is made from a matching point on the high rotational speed side to a matching point on the low rotational speed side.

As described above, the vehicle body controller 12, when changing the matching point from the high rotational speed side to the low rotational speed side, changes the target pressure curve from the first target pressure curve a1 to the second target pressure curve b1. Because of this, since the target pressure of the hydraulic motor 10 for travel increases, reduction of the drive circuit pressure is suppressed. For example, consider the case in which the matching point is switched to the low matching point MB1. When the switching to the low matching point MB1 is determined, the maximum absorption torque of the hydraulic pump 4 for travel is increased. Because of this, the pump displacement-drive circuit pressure characteristics are changed from L12 to L11 shown in FIG. 7. Here, if the target pressure curve is maintained at the first target pressure curve a1, the target pressure will have been set at Pt1 which is stipulated by the first target pressure curve a1. In the state in which the drive circuit pressure P is larger than the target pressure Pt1, as is shown in FIG. 4, the motor displacement increases according to the increase in the drive circuit pressure P. Further, when the drive circuit pressure P comes close to the target pressure Pt1, the motor displacement decreases. As a result, the drive circuit pressure P conies close to the target pressure Pt1. In this case, as is shown in FIG. 7, even if the maximum absorption torque of the pump increases, the actual absorption torque does not increase.

Compared with this, in a work vehicle according to the present preferred embodiment, when the switching to the low matching point MN1 is determined, the target pressure curve is switched from the first target pressure curve a1 to the second target pressure curve b1. Because of this, the target pressure increases from Pt1 to Pt2. Because of this, as is shown in FIG. 7, when the maximum absorption torque of the hydraulic pump 4 for travel increases, it is possible to operate the drive circuit pressure to a high value. Further, as a result, when the drive circuit pressure P becomes a value in the vicinity of the target pressure Pt2, the output torque of the engine 1 matches with the absorption torque of the hydraulic pump 4 for travel (see the matching point MPb). This matching point MPb coincides with the low matching point MB1. Because of this, in the work vehicle 50 according to the present preferred embodiment, when the matching point is changed from the high matching point MA1 to the low matching point MB1, it is possible to cause arrival at the low matching point MB1 which is the target. Or else, it is possible to come close to the low matching point MB1 which is the target. Because of this, it is possible to further improve the effect of enhancement of the fuel consumption of the engine 1. Further, in FIG. 6, the target pressure Pt1 is the target pressure stipulated by the first target pressure curve a1 when the engine rotational speed is Nea. The target pressure Pt2 is the target pressure stipulated by the second target pressure curve b1 when the engine rotational speed is Neb. Neb is smaller than Nea. For example, Pt1, Nea, Pt2, and Neb are set so that the absorption horsepowers before and after changing the matching point are close.

Further, on the contrary, when the matching point is changed from the low matching point MB1 to the high matching point MA1, the target pressure curve is changed from the second target pressure curve b1 to the first target pressure curve a1. Because of this, the target pressure of the hydraulic motor 10 for travel is reduced. Because of this, it is possible to make the matching point to arrive at the desired high matching point MA1 from the low matching point MB1. Or else, it is possible to cause the matching point to come close to the desired high matching point MA1. Because of this, it is possible to increase the work efficiency. Further, when changing the matching point from the low matching point MB1 to the high matching point MA1, if the matching point curve remains the same second target pressure curve b1, the pump displacement becomes small, (see Ma1' of FIG. 7). In this case, the work efficiency deteriorates. However, in the work vehicle according to the present preferred embodiment, the target pressure curve is changed from the second target pressure curve b1 to the first target pressure curve a1. Because of this, since reduction in the pump displacement is suppressed, it is possible to suppress deterioration in the work efficiency.

Next, the various conditions for carrying out switching of the absorption torque of the hydraulic pump 4 for travel described above.

Control I While Traveling on an Upward Slope

Figure 8:
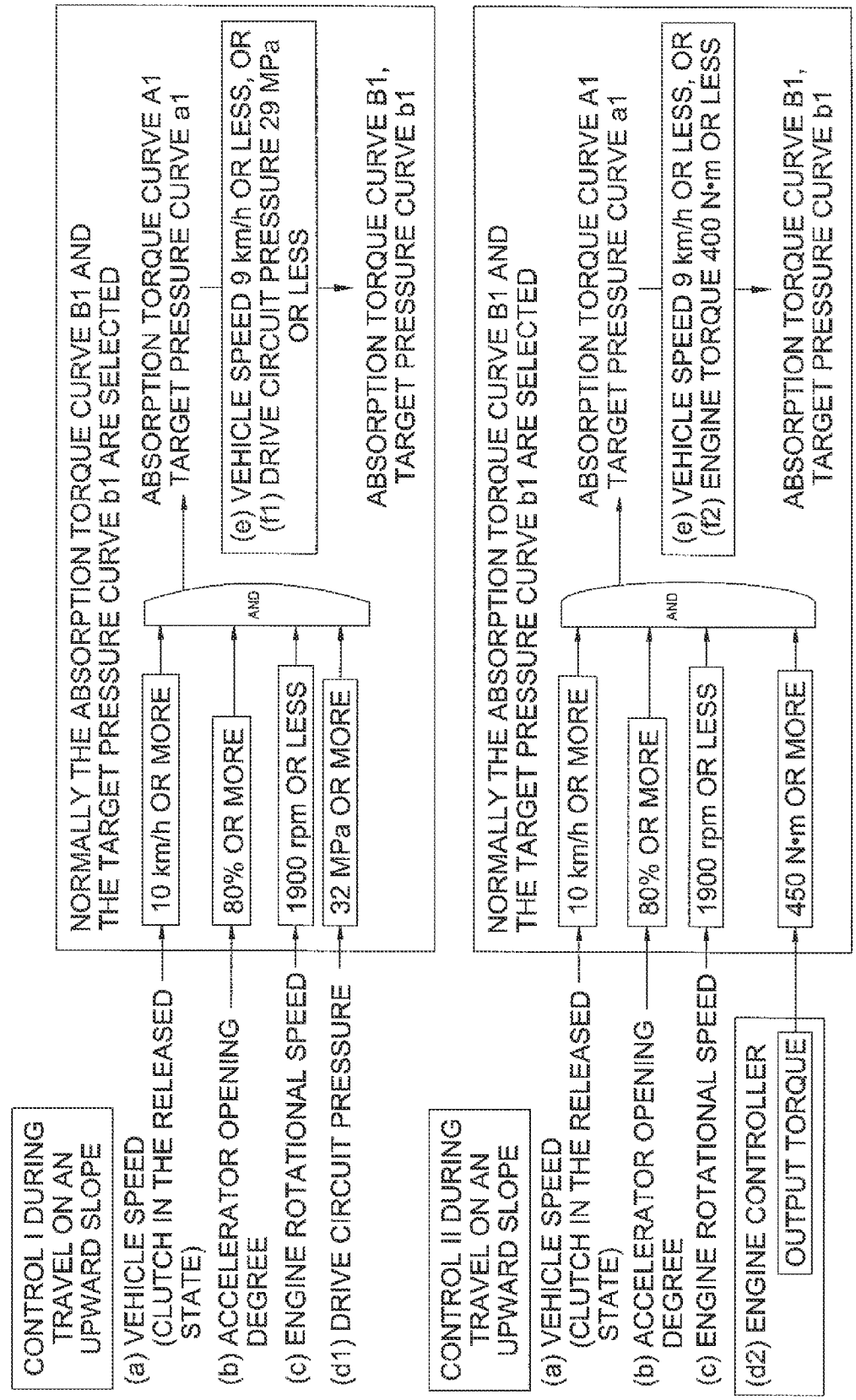
FIG. 8 is a control diagram showing the control conditions when traveling on an upward slope.

In the work vehicle 50 according to the present preferred embodiment, as shown in the upper part of FIG. 8, when the vehicle speed, the accelerator opening degree, the engine rotational speed, and the drive circuit pressure respectively satisfy the following conditions, the absorption torque curve shown in FIG. 5 is switched from B1 to A1, and the matching point is transferred from the low matching point MB1 to the high matching point MA1. Further, the target pressure curve shown in FIG. 6 is switched from the second target pressure curve b1 to the first target pressure curve a1.

In concrete terms, when all the following conditions are satisfied as a first condition, control is carried out so as to switch the matching point from B1 that matches the absorption torque curve of the hydraulic pump 4 for travel on the low rotational speed side to A1 that matches on the high rotational speed side.

a) the vehicle speed is 10 km/h or more (the clutch in the released state),
b) the accelerator opening degree is 80% or more,
c) the engine rotational speed is 1900 rpm or less, and
d1) the drive circuit pressure is 32 MPa or more.

Further, at this time, control is carried out so as to switch the target pressure curve from the second target pressure curve b1 to the first target pressure curve a1.

in other words, under the first condition, when all the above conditions a, b, c, and d1 are satisfied, the control of switching the absorption torque of the hydraulic pump 4 for travel and the control of switching the target pressure curve are carried out.

Here, in the first condition, the reason for taking the vehicle speed (condition a) and the accelerator opening degree (condition b) as the conditions is because, in case the driver asks for further acceleration while high speed travel is being made in the work vehicle, it is assumed to be equivalent to travel on an upward slope in which case larger than normal horsepower is required of the hydraulic pump 4 for travel. Further, the reason for taking the engine rotational speed (c) and the drive circuit pressure (d1) as the conditions is because, the state in which the engine rotational speed is equal to or less than a prescribed value while high speed travel is being made with a relatively high accelerator opening degree, and also, the drive circuit pressure is equal to or higher than a prescribed value is assumed to be equivalent to travel on an upward slope in which case larger than normal horsepower is required of the hydraulic pump 4 for travel. Therefore, in case such a first condition is satisfied, by shifting the matching point in a direction so as to increase the absorption torque of the hydraulic pump 4 for travel, when high speed travel on an upward slope, etc. is required, it is possible to travel under a condition in which the hydraulic pump 4 is obtaining sufficient horsepower.

Next, after carrying out control of switching the absorption torque curve described above from B1 to A1, the second condition at the time of carrying out the control of returning from A1 to B1 is explained below.

In concrete terms, when any one of the following is satisfied as the second condition, control is carried out so as to return the absorption torque curve of the hydraulic pump 4 for travel from A1 matching on the high rotational speed side to B1 matching on the low rotational speed side.

e) the vehicle speed is 9 km/h or less, or
f1) the drive circuit pressure is 29 MPa or less.

In addition, control is carried out of switching the target pressure curve from the first target pressure curve a1 to the second target pressure curve b1.

The reason for selecting the vehicle speed and the drive circuit pressure becoming equal to or less than their prescribed values as the necessary condition for the second condition is because, when the vehicle speed or the drive circuit pressure become equal to or less than the prescribed values, it is assumed to be a state in which high speed travel on an upward slope has ended. In particular, in the present preferred embodiment, as the second condition, the accelerator opening degree and the engine rotational speed that are present in the first condition are not present. This is because, if the accelerator opening degree is made one in the second condition, in spite of the amount of operation of the accelerator operating member 13a has been reduced, because of switching the absorption torque curve from A1 to B1 the absorption torque of the hydraulic pump increases (see FIG. 5), and as a result, there is the possibility that the control will be one that is different from the intention of the driver, such as the vehicle speed increasing, or the like addition, because, if the engine rotational speed is made one in the second condition, there is the possibility that shocks at the time of switching the absorption torque of the hydraulic pump 4 for travel in accordance with the fluctuations in the engine rotational speed are generated frequently.

Further, the reason for providing a difference between the set value (9 km/h) of the vehicle speed in the above condition e and the set value (10 km/h) of the vehicle speed in the condition a is in order to avoid the switching of the absorption torque curve between the low rotational speed side and the high rotational speed side being carried out frequently. The same is true for the set value of the drive circuit pressure in the above condition f1.

In the above manner, in the work vehicle 50 installed with an HST, when the prescribed first condition is satisfied, not only the absorption torque curve is switched from B1 to A1 so that the absorption torque of the hydraulic pump 4 for travel increases, but also the target pressure curve is switched from the second target pressure curve b1 to the first target pressure curve a1. Because of this, by switching the matching point with the output torque curve of the engine 1 from low matching point MB1 to the high matching point MA1, travel becomes possible with the necessary horsepower.

However, in the state of matching at the high matching point MA1 described above, when the prescribed second condition is satisfied, not only the absorption torque curve is switched from A1 to B1 so that the absorption torque of the hydraulic pump 4 for travel becomes small, but also the target pressure curve is switched from the first target pressure curve a1 to the second target pressure curve b1. Because of this, the matching point with the output torque curve of the engine 1 changes from the high matching point MA1 to the low matching point MB1, and it is possible to return to travel with the normal low fuel consumption.

Further, after carrying out optimal condition setting respectively for the above first condition and the above second condition, it is possible to avoid the control being carried out in a direction that is not intended by the driver, or the generation of shocks due to the control of absorption torque switching during driving.

Control I While Working during Medium or High Speed Travel

In the work vehicle 50 according to the present preferred embodiment, in addition to the control during travel on an upward slope described above, as is shown in the upper part of FIG. 9, regarding the vehicle speed, accelerator opening degree, engine rotational speed, and the work implement-steering pump pressure, when they respectively satisfy the following conditions, not only the absorption torque curve shown in FIG. 5 is switched from B1 to A1, but also the target pressure curve is switched from the second target pressure curve b1 to the first target pressure curve a1. By this, the matching point is changed from the low matching point MB1 to the high matching point MA1.

In concrete terms, when the conditions are all satisfied, control is carried out so as to switch the absorption torque curve of the hydraulic pump 4 for travel from B1 matching on the low rotational speed side to A1 matching on the high rotational speed side.

a) the vehicle speed is 10 km/h or more (the clutch in the released state), b) the accelerator opening degree is 80% or more, c) the engine rotational speed is 1900 rpm or less, and g1) the work implement-steering pump pressure is 9 MPa or more (the third condition).

in addition, control is carried out so as to switch the target pressure curve from the second target pressure curve b1 to the first target pressure curve a1.

In other words, in the present preferred embodiment, when all the above conditions a, b, c, and g1 are satisfied, the above described control of switching the absorption torque curve of the hydraulic pump 4 for travel and control of switching the target pressure curve are carried out.

Here, the reason that the condition g1 of the work implement-steering pump pressure is given as a third condition is because, in the state in which the accelerator opening degree is 80% or more during medium or high speed travel at 10 km/h or more, if the engine rotational speed falls below a prescribed value and also the work implement-steering pump pressure becomes equal to or more than a prescribed value, it is assumed that the work implement 52 (boom 53 and bucket 54) is in the operating state, and also the load on the work implement 52 is high. Therefore, when such a third condition is additionally satisfied, by shifting the matching point in a direction to reduce the absorption torque of the hydraulic pump 4 for travel, in cases such as when using the work implement 52 during medium or high speed travel, it is possible to operate and travel in a state in which the hydraulic pump 4 for travel has obtained sufficient horsepower.

Next, after carrying out control of switching the absorption torque curve described above from B1 to A1, the second condition at the time of carrying out the control of returning from A1 to B1 is explained below.

In concrete terms, when the condition, h1) the work implement-steering pump pressure is 8 MPa or less, as the fifth condition is satisfied, control is carried out so as to return the absorption torque curve of the hydraulic pump 4 for travel from A1 matching on the high rotational speed side to B1 matching on the low rotational speed side. In addition, control is carried out of switching the target pressure curve from the first target pressure curve a1 to the second target pressure curve b1.

Here, the reason that the condition h1 is set as the fifth condition is because, when the pump pressure becomes the prescribed value or less during medium or high speed travel, it is assumed that the state of using of the work implement 52 during medium or high speed travel has already ended.

Further, the reason for providing a difference between the set value (9 MPa) of the work implement steering pump pressure in the above condition g1 and the set value (8 MPa) of the work implement-steering pump pressure in the condition h1 is in order to avoid the switching of the absorption torque curve between the low rotational speed side and the high rotational speed side being carried out frequently.

Because of this, in the work vehicle 50 installed with an HST, when the prescribed third condition is satisfied, not only the absorption torque curve is switched from B1 to A1 so that the absorption torque of the hydraulic pump 4 for travel increases, but also the target pressure curve is switched from the second target pressure curve b1 to the first target pressure curve a1. Because of this, by switching the matching point with the output torque curve of the engine 1 from low matching point MB1 to the high matching point MA1, travel becomes possible with the necessary horsepower even when the work implement 52 is in the operating state during medium or high speed travel.

However, in the state of matching on the high rotational speed side described above, when the prescribed fifth condition is satisfied, not only the absorption torque curve is switched from A1 to B1 so that the absorption torque of the hydraulic pump 4 for travel becomes small, but also the target pressure curve is switched from the first target pressure curve a1 to the second target pressure curve b1. Because of this, by changing the matching point with the output torque curve of the engine 1 from the high matching point MA1 to the low matching point MB1, it is possible to return to travel with the normal low fuel consumption.

Further, after carrying out optimal condition setting respectively for the above third condition and the above fifth condition, it is possible to avoid the control being carried out in a direction that is not intended by the driver, or the generation of shocks due to the control of absorption torque switching during driving.

Control I During Excavating, During Scooping Up, or the Like

In the work vehicle 50 according to the present preferred embodiment, further even during excavating or scooping up or the like, control is carried out so that matching is changed from the low rotational speed side to the high rotational speed side by switching the absorption torque curve of the hydraulic pump 4 for travel and the target pressure curve. "Scooping up" is the work of scooping up the target objects such as grass, or the like into the bucket by excavating and heaping up while moving forward.

Figure 10:
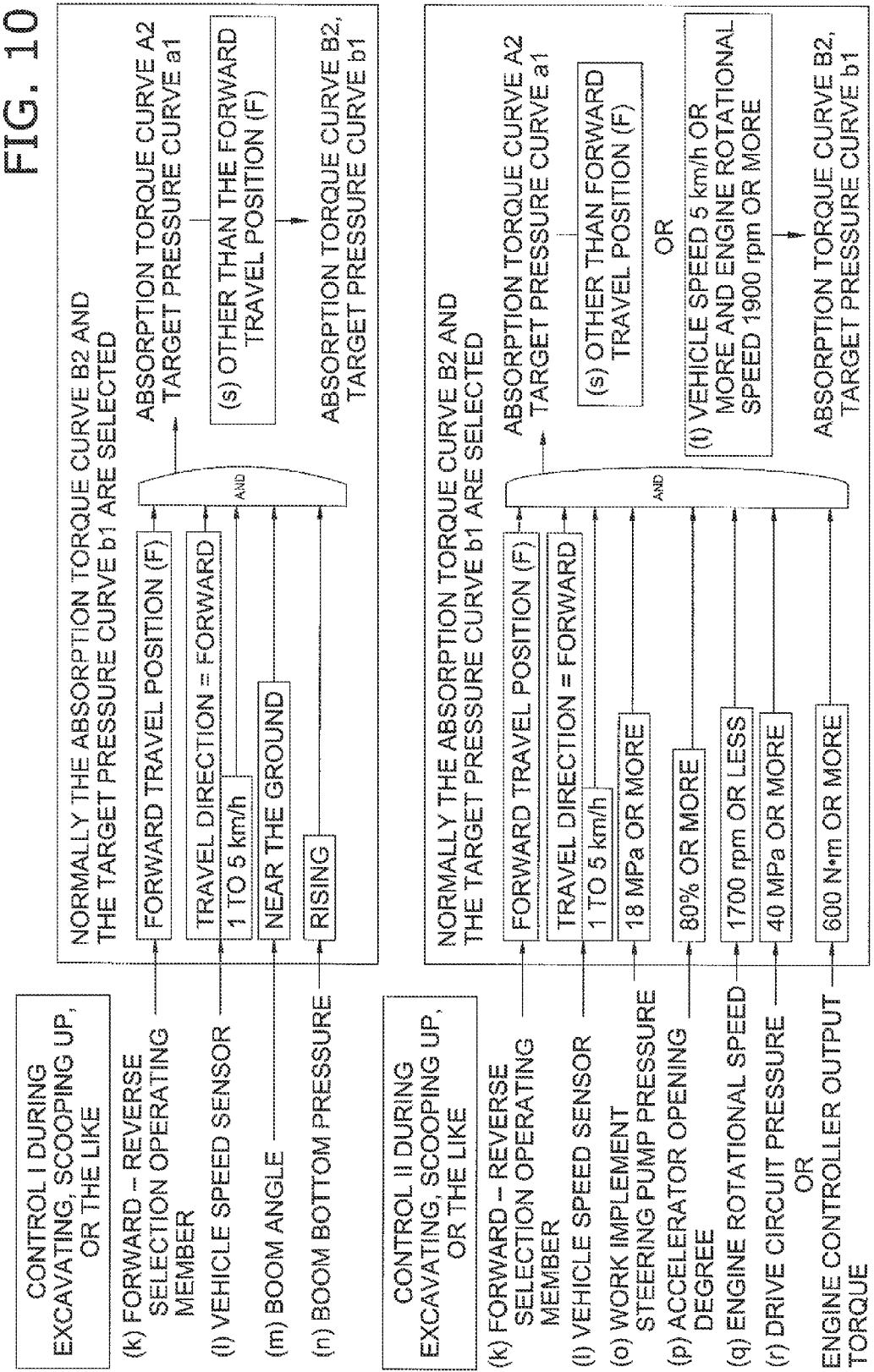
FIG. 10 is a control diagram showing the control conditions during excavating and during scooping.
Figure 11:
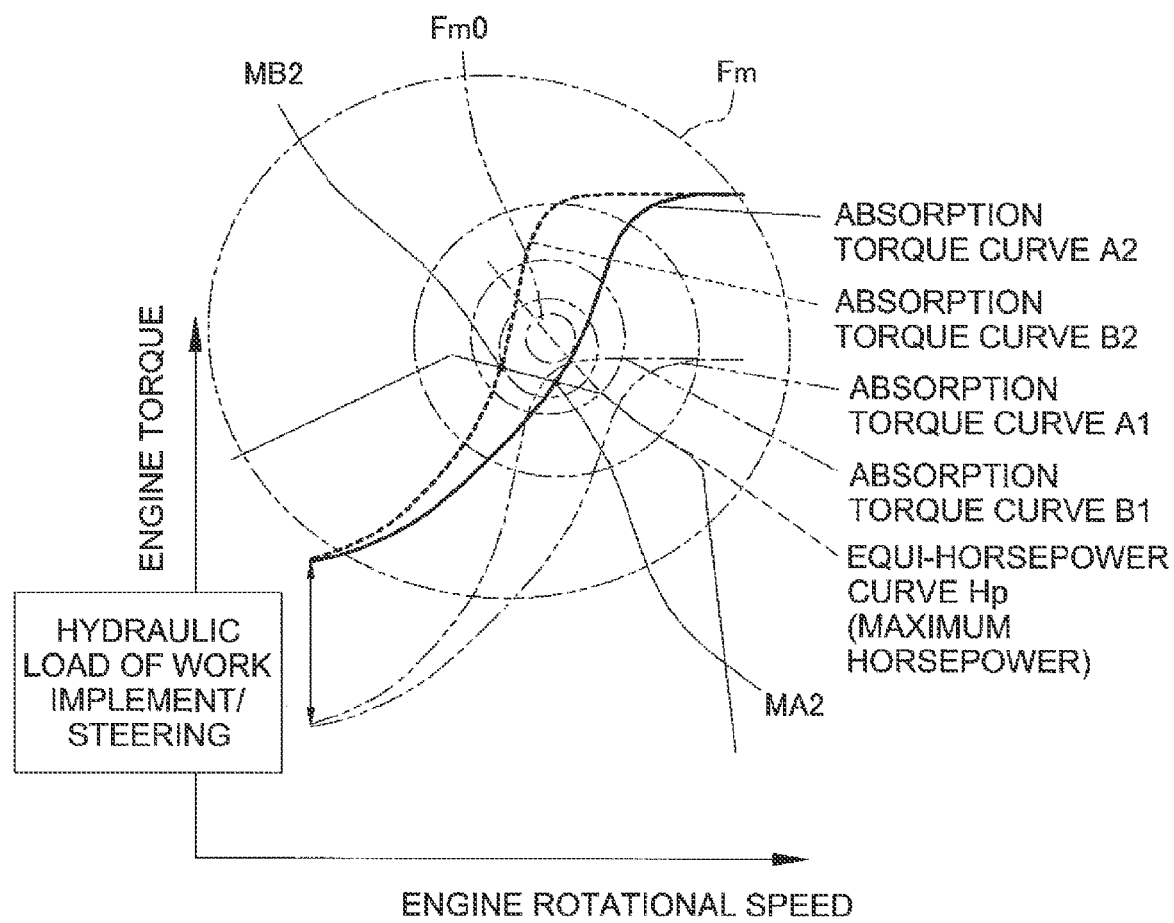
FIG. 11 is a diagram showing an example of the output torque curve of the engine and the absorption torque curve of the hydraulic pump.

As is shown in the upper part of FIG. 10, when the following conditions are satisfied respectively regarding the forward reverse selection operating member 14, the vehicle speed sensor 16, the boom angle, and the boom bottom pressure, as is shown in FIG. 11, not only the absorption torque curve is switched from B2 to A2, but also the target pressure curve is switched from the second target pressure curve b1 to the first target pressure curve a1. Because of this, the matching point is changed from the low matching point MB2 to the high matching point MA2. Further, the boom bottom pressure is the pressure of the hydraulic oil supplied at the time of extending the lifting cylinder 19 and is detected by the boom pressure sensor 22 described above. Here, the absorption torque curves A2 and B2 indicate, with respect to the absorption torque curves A1 and B1 described above, the total absorption torque when a high load other than travel (work implement-steering, and the like) is present.

In concrete terms, when the following conditions are satisfied as a first condition, control is carried out so as to switch the matching point from B2 that matches the absorption torque curve of the hydraulic pump 4 for travel on the low rotational speed side to A2 that matches on the high rotational speed side.

k) the forward-reverse selection operating member 14 is in the forward (F) position, l) the result of detection by the vehicle speed sensor 16 is 1 to 5 km/h traveling in the forward direction, m) the boom angle is in a range of angles indicating that the bucket 54 is positioned near the ground, and n) the boom bottom pressure is rising.

Further, at this time, control is carried out so as to switch the target pressure curve from the second target pressure curve b1 to the first target pressure curve a1.

In other words, in the present preferred embodiment, when the above conditions k, l, m, and n are satisfied, the control of switching the absorption torque of the hydraulic pump 4 for travel and the control of switching the target pressure curve are carried out.

Here, the reason for selecting, as the above switching condition, the state of operation of the forward reverse selection operating member 14 and the result of detection by the vehicle speed sensor 16 is to detect that forward travel is being done at a low speed. In addition, confirming the boom bottom pressure is for detecting the state in which a high load is present on the work implement 52. Further, as a means for detecting the state of high load on the work implement 52 can be, apart from the detection of the boom bottom pressure, detecting that the boom is being raised with the bucket 54 in the tilted state through the operating state of the operating member of the work implement 52 and the boom angle. Therefore, when such conditions k, l, m, and n are satisfied, by shifting the matching point in the direction of raising the absorption torque of the hydraulic pump 4 for travel, even when high load operation or the like is being done under low speed forward travel, it is possible to prevent reduction in the rotational speed, horsepower of the engine 1, reduction of the drive speed of the work implement 52, and engine stalling.

Next, after carrying out control of switching the absorption torque curve described above from B2 to A2, the second condition at the time of carrying out the control of returning from A2 to B2 is explained below.

In concrete terms, when the following is satisfied, control is carried out so as to return the absorption torque curve of the hydraulic pump 4 for travel from A2 matching on the high rotational speed side to B2 matching on the low rotational speed side.

s) the forward-reverse selection operating member 14 is in a position other than the forward (F) position.

Here, the reason for setting the condition n as the condition for returning the matching point to the low rotational speed side is that, when the forward-reverse selection operating member 14 is in a position other than the forward (F) position, that is, when it is in the neutral position (N) or in the reverse (B) position, it is assumed that the state in which a high load is present on the work implement 52 has ended.

Because of this, in the work vehicle 50 installed with an HST, when the prescribed conditions k, l, m, and n are satisfied, not only the absorption torque curve is switched from B2 to A2 so that the absorption torque of the hydraulic pump 4 for travel increases, but also the target pressure curve is switched from the second target pressure curve b1 to the first target pressure curve a1. Because of this, by switching the matching point with the output torque curve of the engine 1 from the low rotational speed side to the high rotational speed side, even in the state in which a high load is applied on the work implement 52 during low speed forward travel, it is possible to prevent reduction in the rotational speed, horsepower of the engine 1, reduction of the drive speed of the work implement 52, and engine stalling.

Further, in the state of matching on the high rotational speed side described above, when the prescribed condition s is satisfied, not only the absorption torque curve is switched from A2 to B2 so that the absorption torque of the hydraulic pump 4 for travel increases, but also the target pressure curve is switched from the first target pressure curve a1 to the second target pressure curve b1. Because of this, by switching the matching point with the output torque curve of the engine 1 from the high rotational speed side to the low rotational speed side, it is possible to return to the normal travel with low fuel consumption.

Preferred Embodiment 2

The following is an explanation of another preferred embodiment of the present invention.

In the present preferred embodiment, as other examples of control during travel on an upward slope described above, the following controls are carried out.

Control II During Travel on an Upward Slope

In the present preferred embodiment, as another control during travel on an upward slope, as is shown in the lower part of FIG. 8, regarding the vehicle speed, the accelerator opening degree, the engine rotational speed, and the output torque instructed by the engine controller 12a, when the following respective conditions are satisfied, not only the absorption torque curve shown in FIG. 5 is switched from B1 to A1, but also the target pressure curve is switched from the second target pressure curve b1 to the first target pressure curve a1.

In concrete terms, when all the following conditions are satisfied as the first condition, control is carried out so as to switch the matching point from B1 that matches the absorption torque curve of the hydraulic pump 4 for travel on the low rotational speed side to A1 that matches on the high rotational speed side.

a) the vehicle speed is 10 km/h or more (the clutch in the released state), b) the accelerator opening degree is 80% or more, c) the engine rotational speed is 1900 rpm or less, and d2) the output torque instructed by the engine controller 12a is 450 N·m or more.

Further, at this time, control is carried out so as to switch the target pressure curve from the second target pressure curve b1 to the first target pressure curve a1

In other words, when all the above conditions a, b, c, and d2 are satisfied, the control of switching the absorption torque of the hydraulic pump 4 for travel and the control of switching the target pressure curve are carried out.

Here, in the first condition, the reason for taking the engine rotational speed (c) and the output torque of the engine controller 12a (d2) as the conditions is because, the state in which the engine rotational speed is a prescribed value or less while high speed travel is being made with a relatively high accelerator opening degree, and also, the output torque of the engine controller 12a is a prescribed value or more is assumed to be equivalent to travel on an upward slope in which case a large absorption torque is required of the hydraulic pump 4 for travel. Therefore, in case such a first condition is satisfied, by shifting the matching point in a direction so as to increase the absorption torque of the hydraulic pump 4 for travel, similar to the above control I during travel on an upward slope, when high speed travel on an upward slope, or the like is required, it is possible to travel under a condition in which the hydraulic pump 4 is obtaining sufficient horsepower.

Next, after carrying out control of switching the absorption torque curve described above from B1 to A1, the second condition at the time of carrying out the control of returning from A1 to B1 is explained below.

In concrete terms, when any one of the following is satisfied as the second condition control is carried out so as to return the absorption torque curve of the hydraulic pump 4 for travel from A1 matching on the high rotational speed side to B1 matching on the low rotational speed side.

d) the vehicle speed is 9 km/h or less, or f2) the output torque of the engine controller 12a is 400 N·m or less.

in addition, control is carried out of switching the target pressure curve from the first target pressure curve a to the second target pressure curve b1.

Further, the reason for selecting the vehicle speed (d) or the output torque of the engine controller 12a (f2) becoming equal to or less than their prescribed values as the condition for the second condition is because, when the vehicle speed or the output torque becomes equal to or less than its prescribed value, it is assumed to be a state in which high speed travel on an upward slope has ended.

Because of this, in the work vehicle 50 installed with an HST, when the prescribed first condition is satisfied, similar to the above control I during travel on an upward slope, travel becomes possible with the necessary horsepower. Further, in the state of matching on the high rotational speed side described above, when the prescribed second condition is satisfied, similar to the above control I during travel on an upward slope, it is possible to return to travel with the normal low fuel consumption. In addition, similar to the above control I during travel on an upward slope, by carrying out optimal condition setting respectively for the above first condition and the above second condition, it is possible to avoid the control being carried out in a direction that is not intended by the driver, or the generation of shocks due to the control of absorption torque switching during driving.

Preferred Embodiment 3

The following is an explanation of another preferred embodiment of the present invention.

In the present preferred embodiment, as an example instead of the control I white operating during medium or high speed travel described in Preferred Embodiment 1 above, the following controls are carried out.

Control II While Working During Medium or High Speed Travel

Figure 9:
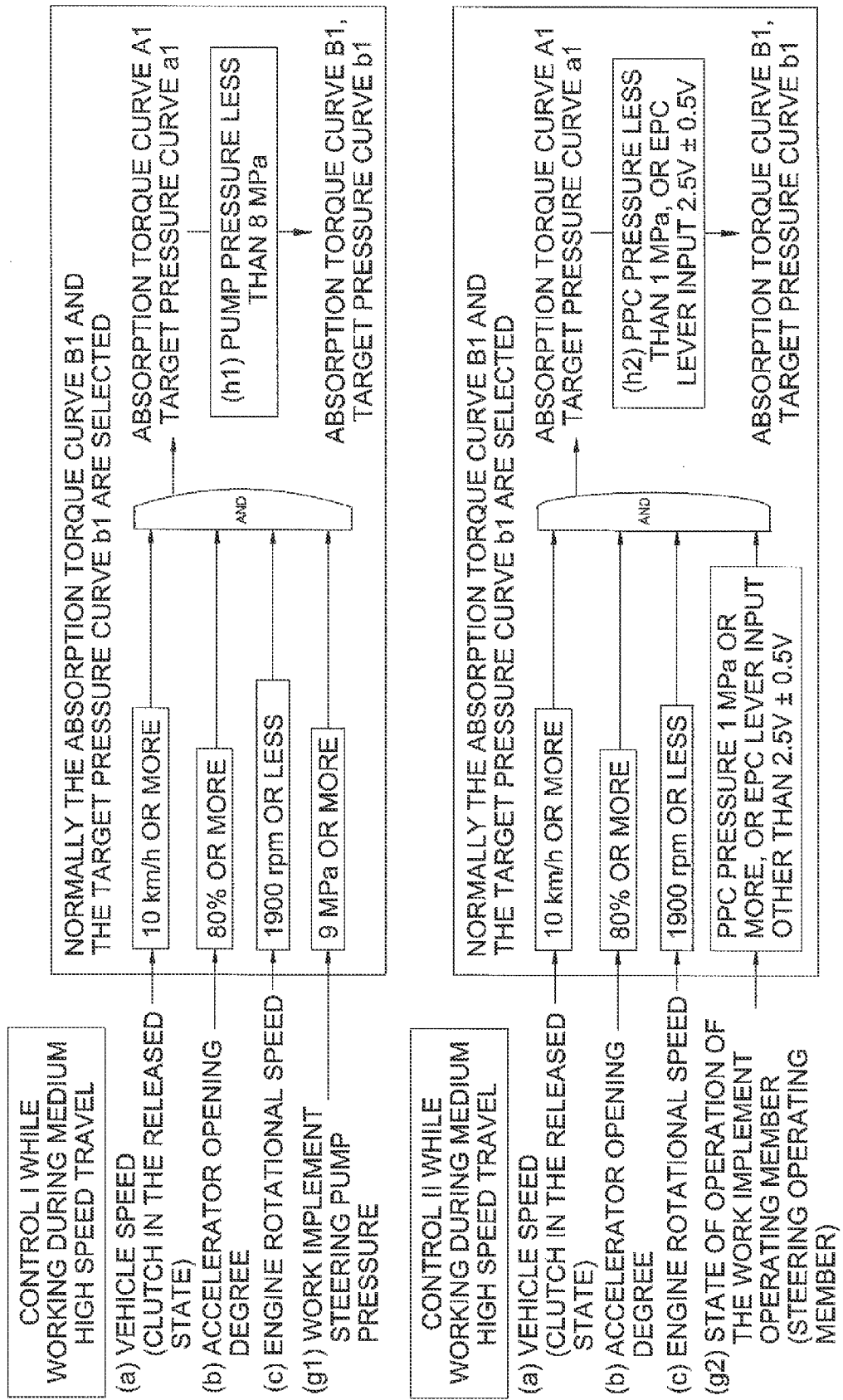
FIG. 9 is a control diagram showing the control conditions when carrying out work during medium or high speed traveling.

In the present preferred embodiment, as another control likewise while working during medium or high speed travel, as is shown in the lower part of FIG. 9, regarding the vehicle speed, accelerator opening degree, engine rotational speed, and the status of use of the work implement operating member 23 and a steering operating member, when they respectively satisfy the following conditions, not only the absorption torque curve shown in FIG. 5 is switched from B1 to A1, but also the target pressure curve is switched from the second target pressure curve b1 to the first target pressure curve a1. By this, the matching point is changed from the low matching point MB1 to the high matching point MA1.

In concrete terms, when all the conditions are satisfied as the fourth condition, control is carried out so as to switch the absorption torque curve of the hydraulic pump 4 for travel from B1 matching on the low rotational speed side to A1 matching on the high rotational speed side.

a) the vehicle speed is 10 km/h or more (the clutch in the released state), b) the accelerator opening degree is 80% or more, c) the engine rotational speed is 1900 rpm or less, and g2) the PPC pressure of the work implement operating member 23 is 1 MPa or more (or the EPC lever input is other than 2.5V±0.5V).

In addition, control is carried out so as to switch the target pressure curve from the second target pressure curve b1 to the first target pressure curve a1.

In other words, here, when all the above conditions a, b, c, and g2 are satisfied, the control of switching the absorption torque of the hydraulic pump 4 for travel and the control of switching the target pressure curve are carried out.

Here, as the fourth condition, the reason for adding the condition g2 is that, by checking the PPC pressure detected by the PPC pressure sensor 21 or the EPC lever input of the work implement operating member 23, it is possible to distinguish the status of use of the work implement 52, and when the above conditions a, b, c, and g2 are satisfied, it is assumed that the state is one in which the work implement 52 is being used during medium or high speed travel, and the load on the work implement 52 is high. Therefore, when conditions such as the above are satisfied, by shifting the matching point in a direction to reduce the absorption torque of the hydraulic pump 4 for travel, similar to the above Control I while operating during medium or high speed travel, when required, such as when using the work implement 52 during medium or high speed travel, it is possible to operate and travel in a state in which the hydraulic pump 4 for travel has obtained sufficient horsepower. Further, the PPC pressure of the above work implement operating member 23 is detected by the PPC pressure sensor 21, and when a pilot hydraulic type work implement operating member 23 is used, this is the pilot pressure generated inside the hydraulic circuit 31 for controlling the work implement according to the amount of operation of the work implement operating member 23. Further, the above EPC lever input is, when an electrical type work implement operating member 23 is used, the electrical signal output in accordance with the amount of operation of the work implement operating member 23.

Next, after carrying out control of switching the absorption torque curve described above from B1 to A1, the second condition at the time of carrying out the control of returning from A1 to B1 is explained below.

In concrete terms, when as the fifth condition, when the condition, h2) the PPC pressure of the work implement operating member 23 is less than 1 MPa (or the EPC lever input is equal to 2.5V±0.5V), is satisfied, control is carried out of returning the absorption torque curve of the hydraulic pump 4 for travel from A1 matching on the high rotational speed side to B1 matching on the low rotational speed side.

Further, as the fifth condition, the reason that the PPC pressure or the EPC lever input is made as the switching condition is that, if any one of them is as the criterion for discrimination, it is easily possible to carry out discrimination of whether or not the work implement 52 is in a state of being used.

Because of this, in the work vehicle 50 installed with an HST, when the prescribed conditions a, b, c, and g2 described above are satisfied, similar to the above control I while operating during medium or high speed travel, it becomes possible to travel with the necessary horsepower. Further, in the state of matching on the high rotational speed side described above, when the prescribed condition h2 is satisfied, similar to the above control I while operating during medium or high speed travel, it is possible to return to travel with the normal low fuel consumption. In addition, similar to the above control I while operating during medium or high speed travel, by carrying out optimal condition setting respectively for the above first condition and the above second condition, it is possible to avoid the control being carried out in a direction that is not intended by the driver, or the generation of shocks due to the control of absorption torque switching during driving.

Preferred Embodiment 4

The following is an explanation of another preferred embodiment of the present invention.

in the present preferred embodiment, as an example instead of control I during excavating, scooping up, or the like described in Preferred Embodiment 1 above, the following controls are carried out.

Control II During Excavating, During Scooping Up, or the Like

In the work vehicle 50 installed with an HST according to the present preferred embodiment, likewise as another control during the high load state of the work implement while traveling forward at a low speed, as is shown in the lower part of FIG. 10, when the following conditions are satisfied respectively regarding the forward-reverse selection operating member 14, the vehicle speed, work implement steering pump pressure, accelerator opening degree, engine rotational speed, drive circuit pressure or the output torque of the engine controller 12a, as is shown in FIG. 11, not only the absorption torque curve is switched from B2 to A2, but also the target pressure curve is switched from the second target pressure curve b1 to the first target pressure curve a1. Because of this, the matching point is changed from the low rotational speed side to the high rotational speed side.

In concrete terms, when the following conditions are satisfied, control is carried out so as to switch the matching point from B2 that matches the absorption torque curve of the hydraulic pump 4 for travel on the low rotational speed side to A2 that matches on the high rotational speed side.

k) the forward-reverse selection operating member 14 is in the forward (F) position, l) the vehicle speed is 1 to 5 km/h traveling in the forward direction, o) the work implement steering pump pressure is 18 MPa or more, p) the accelerator opening degree is 80% or more, q) the engine rotational speed is 1700 rpm or less, and r) the drive circuit pressure is 40 MPa or more, or the output torque of the engine controller 12a is 600 N·m or more.

Further, at this time, control is carried out so as to switch the target pressure curve from the second target pressure curve b1 to the first target pressure curve a1.

In other words, here, when the above conditions k, l, o, p, q, and r are satisfied, the control of switching the absorption torque of the hydraulic pump 4 for travel and the control of switching the target pressure curve are carried out.

Here, the reason for setting the conditions o, p, q, and r as the above switching conditions is because, the state in which the engine rotational speed has become low in spite of the opening degree of the accelerator being high, or the state in which drive circuit pressure or the output torque of the engine controller 12a being their prescribed values or more is assumed to be a state of high travel load or high work implement load. Therefore, when such conditions are satisfied, by shifting the matching point in the direction of reducing the absorption torque of the hydraulic pump 4 for travel, similar to the above control I during excavation, during scooping up, or the like, when a high load state during low speed forward travel is necessary, it is possible to avoid reductions in the engine rotational speed or horsepower, reduction in the operating speed of the work implement 52, and of the occurrence of engine stalling.

Next, after carrying out control of switching the absorption torque curve described above from B2 to A2, the condition at the time of carrying out the control of returning from A2 to B2 is explained below.

In concrete terms, when any one of the following is satisfied, control is carried out so as to return the absorption torque curve of the hydraulic pump 4 for travel from A2 matching on the high rotational speed side to B2 matching on the low rotational speed side.

s) the forward-reverse selection operating member 14 is in a position other than the forward (F) position, or t) the vehicle speed is 5 km/h or more and the engine rotational speed is 1900 rpm or more.

In addition, the target pressure curve is switched from the first target pressure curve a1 to the second target pressure curve b1.

Here, as the above condition, the reason for making the forward-reverse selection operating member 14, or the vehicle speed+the engine rotational speed as the switching condition is that, if any one of them is as the criterion for discrimination, it is easily possible to carry out discrimination of whether or not the high load state during slow speed forward travel has ended.

Because of this, in the work vehicle 50 installed with an HST, when the above prescribed conditions (k, l, o, p, q, and r) are satisfied, similar to control I during excavation, during scooping up, or the like, the engine rotational speed and horsepower, and the operating speed of the work implement 52 are not reduced, and it is also possible to prevent engine stalling from occurring. Further, in the state of matching on the high rotational speed described above, when the prescribed condition s or condition t described above is satisfied, similar to control I during excavation, during scooping up, or the like, it is possible to return to travel with the normal low fuel consumption.

Preferred Embodiment 5

The following is an explanation of another preferred embodiment of the present invention.

In the present preferred embodiment, as another example instead of control during excavating, scooping up, or the like described in Preferred Embodiment 1 above, the following controls are carried out.

Control III During Excavating, During Scooping Up, or the Like

Figure 12:
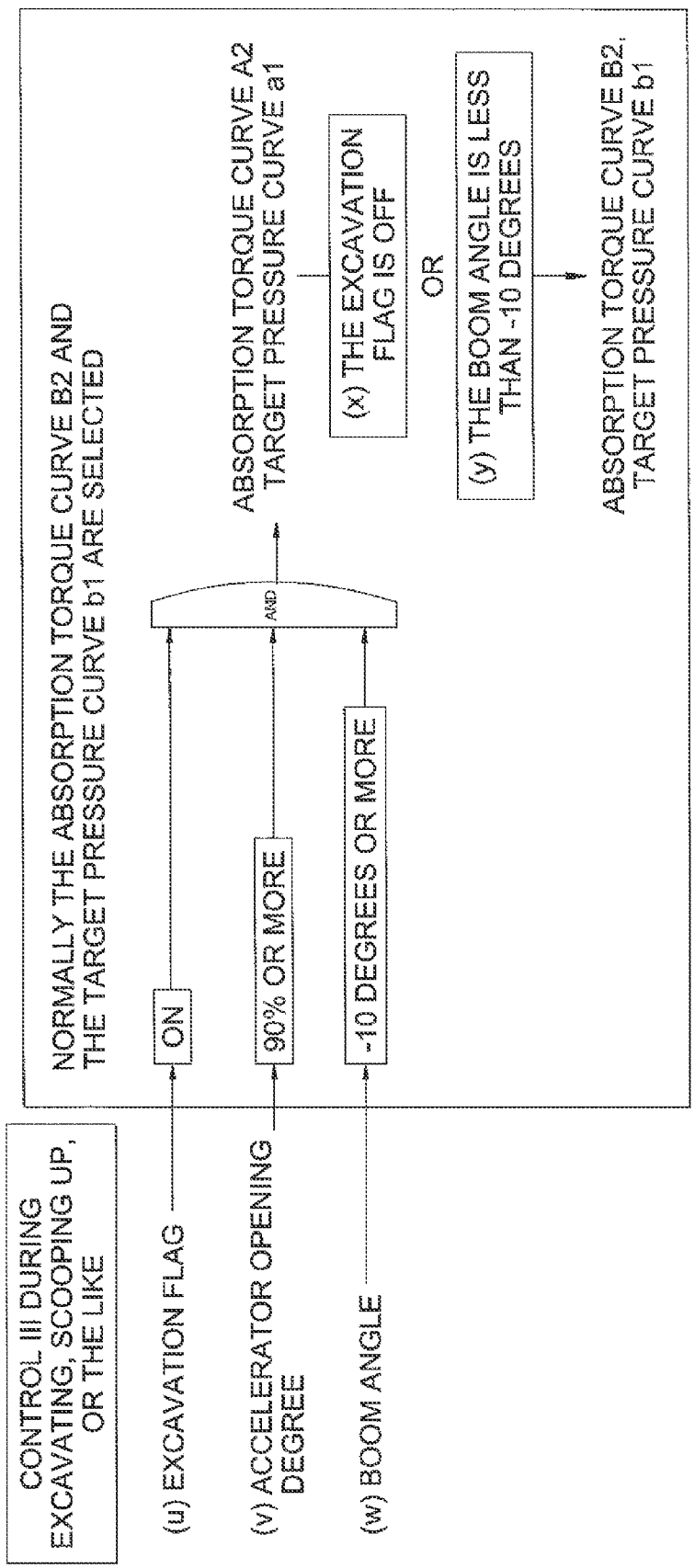
FIG. 12 is a control diagram showing the control conditions during excavating and during scooping according to the fifth preferred embodiment.

In other words, as is shown in FIG. 12, regarding the excavation flag, accelerator opening degree, and the boom angle, when they respectively satisfy the following conditions, as is shown in FIG. 11, not only the absorption torque curve is switched from B2 to A2, but also the target pressure curve is switched from the second target pressure curve b1 to the first target pressure curve a1. Because of this, the matching point is changed from the low matching point MB2 to the high matching point MA2.

In concrete terms, when the conditions are all satisfied, control is carried out so as to switch the matching point from B2 that matches the absorption torque curve of the hydraulic pump 4 for travel on the low rotational speed side to A2 that matches on the high rotational speed side.

u) the excavation flag is "ON", v) the accelerator opening degree is 90% or more, and w) the boom angle is −10 degrees or more.

Further, control is carried out so as to switch the target pressure curve from the second target pressure curve b1 to the first target pressure curve a1. In other words, in the present preferred embodiment, when all the above conditions u, v, and w are satisfied, the above control of switching the absorption torque of the hydraulic pump 4 for travel and the control of switching the target pressure curve are carried out.

Figure 13:
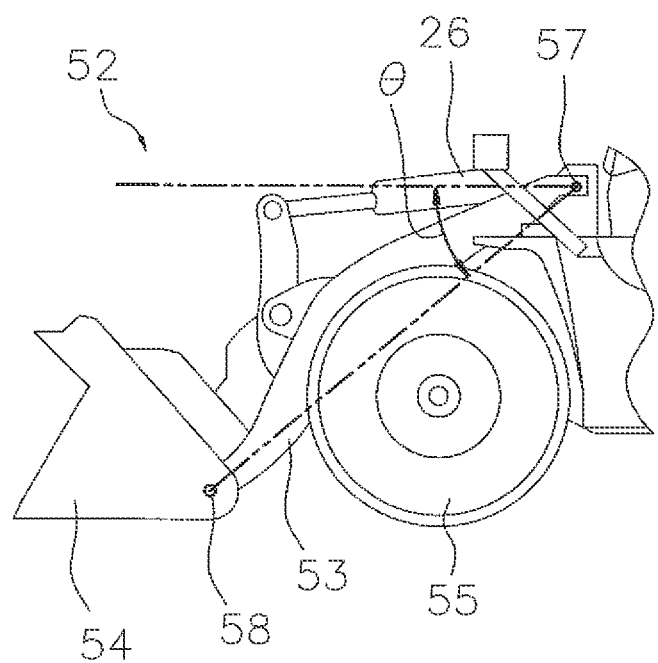
FIG. 13 is a side elevation diagram of a working machine for showing the definition of the boom angle.

Further, the boom angle, as is shown in FIG. 13, in the side view, the horizontal direction is taken as 0 degrees, and the angle between the line jointing the boom pin 57 and the bucket pin 58 and the horizontal direction is the angle θ. An angle below the horizontal direction is taken to have a negative value, and an angle above the horizontal direction is taken to have a positive value. The boom angle is defined so that it increases towards above.

The excavation flag being ON implies that the operation aspect is excavation. The vehicle body controller 12, based on the traveling state of the vehicle and the operating state of the work implement 52, determines whether or not the aspect of operation is excavation. The vehicle body controller 12, when the aspect of operation is determined to be excavation, sets the excavation flag to ON. The vehicle body controller 12, when the aspect of operation is determined to be other than excavation, sets the excavation flag to OFF.

Figure 14:
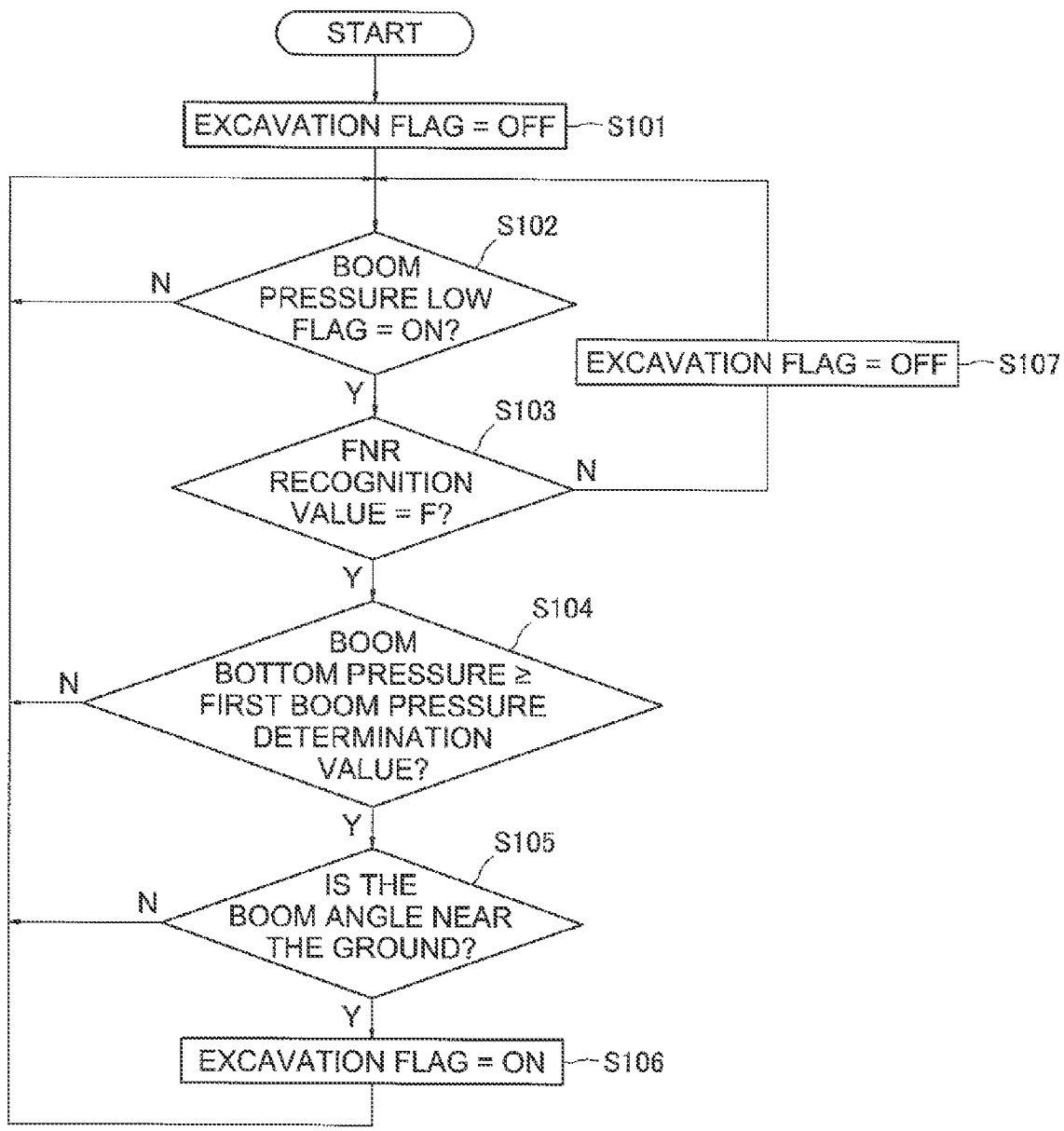
FIG. 14 is a flow chart showing the processing for determining whether the work aspect is excavating or not.

FIG. 14 is a flow chart showing the processing for determining whether the excavation flag is ON or not. In other words, FIG. 14 is a flow chart showing the processing for determining whether or not the aspect of operation is excavation. As is shown in HG 14, in Step S101 the vehicle body controller 12 sets the excavation flag to OFF. In Step S102, the vehicle body controller 12 determines whether or not the boom pressure low flag is ON. The boom pressure low flag being ON indicates that the bucket 54 is in the empty load state. The processing of determining the boom pressure low flag is described later.

In Step S103, the vehicle body controller 12 determines whether the FNR recognition value is F or not. The FNR recognition value is information indicating in which of the three states of forward travel state, reverse travel state, and neutral state is the vehicle in. The FNR recognition value being F means that the vehicle is in the forward travel state. The FNR recognition value being R means that the vehicle is in the reverse travel state. The FNR recognition value being N means that the vehicle is in the neutral state. The vehicle body controller 12, based on the detected signal from the forward-reverse travel selection operation member 14, determines whether the FNR recognition value is F or not.

In Step S104, the vehicle body controller 12, determines whether or not the boom bottom pressure is equal to or more than a first boom pressure determining value. The first boom pressure determining value is a value that the boom bottom pressure can take during excavation. The first boom pressure determining value is obtained and set in advance by experiments or simulations. The first boom bottom pressure determining value is a value according to the boom angle. The vehicle body controller 12 stores the boom pressure determining value information (hereinafter referred to as the "first boom pressure determining value information) that shows the relationship between the first boom pressure determining value and the boom angle. The first boom pressure determining value information, for example, is a table or a map showing the relationship between the first boom pressure determining value and the boom angle. The vehicle body controller 12, by referring to the first boom pressure determining value information, determines the first boom pressure determining value corresponding to the boom angle.

In Step S105, a determination is made as to whether or not the boom angle is in a range of angles indicating that the bucket 54 is positioned near the ground.

When all the conditions from Step S102 to Step S105 are satisfied, the processing proceeds to Step S106. In Step S106, the vehicle body controller 12 sets the excavation flag to ON. In other words, the vehicle body controller 12 determines that the aspect of operation is excavation when all the conditions from Step S102 to Step S105 are satisfied. This is because when all the conditions from Step S102 to Step S105 are satisfied, it is possible to consider that the work vehicle 50 has entered the preparation stage for excavation. When at least one condition among the conditions of Step S102, S104, and S105 is not satisfied, the determining in Step S102 to Step S105 is repeated. Further, when the Step S103 is not satisfied, the processing proceeds to Step S107. In Step S107, the vehicle body controller 12 sets the excavation flag to OFF. In other words, when the vehicle is in the reverse travel or in the neutral state, the excavation flag is set to OFF. Therefore, once the aspect of operation is determined to be excavation, after that, until the forward-reverse travel selection operating member 14 is switched from the forward travel position to the reverse travel position, or, until the forward reverse travel selection operating member 14 is switched from the forward travel position to the neutral position, even if the other conditions are not satisfied, the ON state of the excavation flag is maintained.

Figure 15:
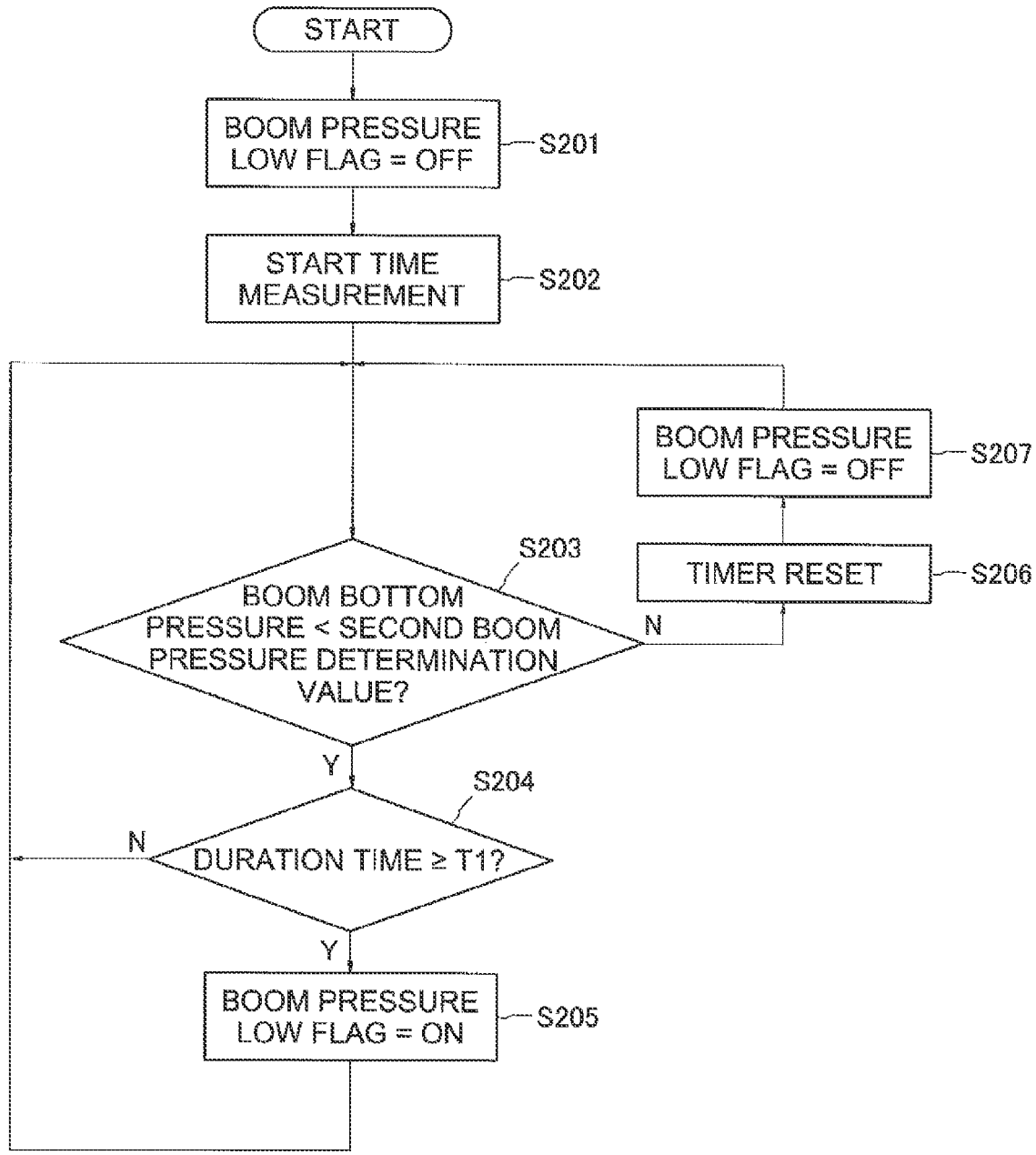

FIG. 15 is a flow chart showing the processing for determining whether or not the boom pressure low flag is ON or not. As is shown in FIG. 15, in Step S201, the vehicle body controller 12 sets the boom pressure low flag to OFF.

in Step S202, the vehicle body controller 12 starts the timer measurement. Here, the timer measures the duration time when the conditions for setting the boom pressure low flag to OFF are being satisfied.

in Step S203, the vehicle body controller 12 determines whether or not the boom bottom pressure is smaller than the second boom pressure determination value. The second boom pressure determination value is the value of the boom bottom pressure that can be taken when the bucket is in the empty load state. The vehicle body controller 12 stores the boom pressure determination value information (hereinafter referred to as the "second boom pressure determination value information) showing the relationship between the second boom pressure determination value and the boom angle. The second boom pressure determination value information, for example, is a table or a map showing the relationship between the second boom pressure determination value and the boom angle. The vehicle body controller 12, by referring to the second boom pressure determination value information, determines the second boom pressure determination value according to the boom angle. In the second boom pressure determination value information, when the boom angle is larger than 0 degrees, the second boom pressure determination value remains constant at the value when the boom angle is 0 degrees. This is because the rate of increase of the boom bottom pressure when the boom angle is larger than 0 degrees is smaller than the rate of increase of the boom bottom pressure when the boom angle is smaller than 0 degrees, and the second boom pressure determination value for boom angles larger than 0 can be approximated by the second boom pressure determination value when the boom angle is 0.

In Step S204, the vehicle body controller 12 determines whether or not the time measured by the timer is equal to or more than a prescribed time threshold value T1. In other words, the duration time determining section 67 determines whether or not the duration time over which the condition of Step S203 is satisfied is equal to or above the prescribed time threshold value T1. The time threshold value T1 is set to a time duration so that it is possible to deem that the condition of Step S203 is not being satisfied temporarily. When the time measured by the timer is not equal to or above the prescribed time threshold value T1, the determination of Step S203 is repeated. In Step S204, if the time measured by the timer is equal to or above the prescribed time threshold value T1, the processing proceeds to Step S205.

In Step S205, the vehicle body controller 12 sets the boom pressure low flag to ON. The vehicle body controller 12, in Step S203, determines that the boom bottom pressure is not smaller than the second boom pressure determination value, the processing proceeds to Step S206. In Step S206, the vehicle body controller 12 resets the timer. Further, in Step S207, the vehicle body controller 12 sets the boom pressure low flag to OFF.

Next, the second condition at the time of the control of returning again from A2 to B2 after carrying out the control of switching the absorption torque curve described above from B2 to A2 is described below.

In concrete terms, as is shown FIG. 12, when any one of the conditions— x) the excavation flag is "OFF", and y) the boom angle is less than −10 degrees, is satisfied, control is carried out of returning the absorption torque curve of the hydraulic pump 4 for travel from A2 matching on the high rotational speed side to B2 matching on the low rotational speed side.

As described above, in the present preferred embodiment, in the work vehicle 50 installed with an HST, when the prescribed conditions u, y, and w are satisfied, not only the control of switching the absorption torque curve from B2 to A2 so as to increase the absorption torque of the hydraulic pump 4 for travel is carried out, but also the target pressure curve is switched from the second target pressure curve b1 to the first target pressure curve a1. Because of this, by switching the matching point with the output torque curve of the engine 1 from the low rotational speed side to the high rotational speed side, even in a state in which a high load is applied to the work implement 52 during low speed forward travel, it is possible to avoid reductions in the engine rotational speed or horsepower, reduction in the operating speed of the work implement 52, and of the occurrence of engine stalling.

Further, in the state of matching on the high rotational speed side described above, when the prescribed condition x or y is satisfied, not only the absorption torque curves is switched from A2 to B2 so as to make the absorption torque of the hydraulic pump 4 for travel small, but also the target pressure curve is switched from the first target pressure curve a1 to the second target pressure curve b1. Because of this, by switching the matching point with the output torque curve of the engine 1 from the high rotational speed side to the low rotational speed side, it is possible to return to travel with the normal low fuel consumption.

Other Preferred Embodiment

Although some preferred embodiments of the present invention have been described above, the present invention is not limited to the above preferred embodiments, and it is possible to make various changes without deviating from the scope and intent of the present invention.

(A) In the above preferred embodiments, explanations are given taking the example of the case in which, as conditions for detecting that high speed travel is being made on an upward slope are used whether the vehicle speed, accelerator opening degree, engine rotational speed, drive circuit pressure, and the output torque of the engine controller being above or below the prescribed values. However, the present invention is not limited to these.

For example, regarding the threshold values (prescribed values) set for each condition, it is also possible to set these for each vehicle model of the different work vehicles 50, and it is also possible to change the set values suitably according to the content of operations of the different work vehicles 50 or according to the likings of the driver.

Further, even regarding the control while working during medium or high speed travel, regarding the magnitude of the threshold values (set values) set for each condition, it is possible to make suitable changes in the settings.

Further, it is not necessary to unify the absorption torque curve A1 (A2) during high speed travel on an upward slope and the absorption torque curve A1 (A2) during while working during medium or high speed travel to the same curve, in addition, in the controls shown in FIG. 8 and FIG. 9, it is not necessary to take the engine rotational speed as one of the conditions. Furthermore, it is not necessary for the engine controller and the vehicle body controller to be separate, and it is also possible to combine them together as a single controller.

(B) In the above preferred embodiments, the explanations are given taking the example of the work vehicle 50 installed with a 1-pump 1-motor HST system composed of one hydraulic pump and a hydraulic motor 10 for travel. However, the present invention is not limited to this. For example, it is also possible to apply the present invention to a work vehicle installed with an HST system composed of one hydraulic pump and two hydraulic motors for travel.

(C) In the above preferred embodiments, explanations are given taking the example of a wheel loader as a work vehicle to which the present invention is applied. However, the present invention is not limited to this. For example, it is also possible to apply the present invention to other work vehicles installed with an HST system.

According to the illustrated embodiments, it is possible to provide a work vehicle and a method for controlling a work vehicle wherein it is possible to further increase the effect of improving the engine fuel consumption obtained by changing the matching point from the high rotational speed side to the low rotational speed side.

The invention claimed is:

1. A work vehicle comprising:
an engine;
a variable displacement type hydraulic pump for travel driven by the engine;
a variable displacement type hydraulic motor for travel driven by a hydraulic oil ejected from the hydraulic pump for travel;
a pressure detecting section configured to detect a the drive circuit pressure which is the pressure of the hydraulic oil fed from the hydraulic pump for travel to the hydraulic motor for travel;
an engine controller configured to adjust an output torque from the engine; and
a control section configured to increase a displacement of the hydraulic motor for travel when the drive circuit pressure becomes larger than a target pressure determined according to an engine rotational speed, to reduce the displacement of the hydraulic motor for travel when the drive circuit pressure becomes smaller than the target pressure, and to increase the target pressure of the hydraulic motor for travel when changing a matching point of an absorption torque curve of the hydraulic pump for travel with respect to an output torque curve of the engine from a high rotational speed side to a low rotational speed side wherein the target pressure is set by the control section based on a target pressure curve that stipulates the target pressure with respect to the engine rotational speed.

2. The work vehicle according to claim 1, wherein
the control section is configured to reduce the target pressure of the hydraulic motor for travel, when changing the matching point from the low rotational speed side to the high rotational speed side.

3. The work vehicle according to claim 1, further comprising
an accelerator operating member operated by an operator; and
a vehicle speed detecting section configured to detect a vehicle speed,
the control section being configured to change the matching point from the low rotational speed side to the high rotational speed side, when a first condition of satisfying that the vehicle speed is equal to or higher than a prescribed speed, that an amount of operation of the accelerator operating member is equal to or more than a prescribed amount, that the engine rotational speed is equal to or lower than a prescribed rotational speed, and that the drive circuit pressure is equal to or more than a prescribed pressure, is satisfied.

4. The work vehicle according to claim 1, wherein
the control section is configured to change the matching point from the high rotational speed side to the low rotational speed side, when a second condition that a vehicle speed or the drive circuit pressure becomes equal to or lower than a prescribed value is satisfied.

5. A work vehicle comprising:
an engine;
a variable displacement type hydraulic pump for travel driven by the engine;
a variable displacement type hydraulic motor for travel driven by a hydraulic oil ejected from the hydraulic pump for travel;
a pressure detecting section configured to detect a the drive circuit pressure which is the pressure of the hydraulic oil fed from the hydraulic pump for travel to the hydraulic motor for travel;
an engine controller configured to adjust an output torque from the engine; and
a control section configured to increase a displacement of the hydraulic motor for travel when the drive circuit pressure becomes larger than a target pressure determined according to an engine rotational speed, to reduce the displacement of the hydraulic motor for travel when the drive circuit pressure becomes smaller than the target pressure, and to increase the target pressure of the hydraulic motor for travel when changing a matching point of an absorption torque curve of the hydraulic pump for travel with respect to an output torque curve of the engine from a high rotational speed side to a low rotational speed side, the target pressure being set by the control section based on a target pressure curve that stipulates the target pressure with respect to the engine rotational speed,
the target pressure curve including a first target pressure curve, and a second target pressure curve that stipulates the target pressure larger than the first target pressure curve at the same engine rotational speed, and
the control section being configured to change the target pressure curve for setting the target pressure from the first target pressure curve to the second target pressure curve, when changing the matching point from the high rotational speed side to the low rotational speed side.

6. The work vehicle according to claim 5, wherein
the control section is configured to reduce the target pressure of the hydraulic motor for travel, when changing the matching point from the low rotational speed side to the high rotational speed side.

7. The work vehicle according to claim 5, further comprising
an accelerator operating member operated by an operator; and
a vehicle speed detecting section configured to detect a vehicle speed,
the control section being configured to change the matching point from the low rotational speed side to the high rotational speed side, when a first condition of satisfying that the vehicle speed is equal to or higher than a prescribed speed, that an amount of operation of the accelerator operating member is equal to or more than a prescribed amount, that the engine rotational speed is equal to or lower than a prescribed rotational speed, and that the drive circuit pressure is equal to or more than a prescribed pressure, is satisfied.

8. The work vehicle according to claim 5, wherein
the control section is configured to change the matching point from the high rotational speed side to the low rotational speed side, when a second condition that a vehicle speed or the drive circuit pressure becomes equal to or lower than a prescribed value is satisfied.

9. A method of controlling a work vehicle including an engine, a variable displacement type hydraulic pump for travel driven by the engine, a variable displacement type hydraulic motor for travel driven by a hydraulic oil ejected from the hydraulic pump for travel, and a pressure detecting section that detects a drive circuit pressure which is a pressure of the hydraulic oil fed from the hydraulic pump for travel to the hydraulic motor for travel, the method of controlling comprising:
increasing a displacement of the hydraulic motor for travel when the drive circuit pressure becomes larger than a target pressure determined according to an engine rotational speed, and reducing the displacement of the hydraulic motor for travel when the drive circuit pressure becomes smaller than the target pressure and
increasing the target pressure of the hydraulic motor for travel when changing a matching point of an absorption torque curve of the hydraulic pump for travel with respect to an output torque curve of the engine from a high rotational speed side to a low rotational speed side wherein the target pressure is set based on a target pressure curve that stipulates the target pressure with respect to the engine rotational speed.

10. The method of controlling a work vehicle according to claim 9, wherein
the target pressure is set based on a target pressure curve that stipulates the target pressure with respect to the engine rotational speed,
the target pressure curve includes a first target pressure curve, and a second target pressure curve that stipulates the target pressure larger than the first target pressure curve at the same engine rotational speed, and
the control section is configured to change the target pressure curve for setting the target pressure from the first target pressure curve to the second target pressure curve, when changing the matching point from the high rotational speed side to the low rotational speed side.

* * * * *